(12) United States Patent
Guan et al.

(10) Patent No.: US 10,333,607 B2
(45) Date of Patent: *Jun. 25, 2019

(54) CHANNEL STATE INFORMATION TRANSMISSION METHOD, USER EQUIPMENT, AND ACCESS NETWORK DEVICE

(71) Applicant: Huawei Technologies Co., Ltd., Shenzhen (CN)

(72) Inventors: Lei Guan, Beijing (CN); Sha Ma, Beijing (CN); Zhiyu Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,412

(22) Filed: Aug. 22, 2018

(65) Prior Publication Data

US 2018/0367201 A1 Dec. 20, 2018

Related U.S. Application Data

(63) Continuation of application No. 15/710,350, filed on Sep. 20, 2017, now Pat. No. 10,084,524, which is a
(Continued)

(51) Int. Cl.
*H04B 7/06* (2006.01)
*H04L 1/18* (2006.01)
(Continued)

(52) U.S. Cl.
CPC ......... *H04B 7/0636* (2013.01); *H04B 7/0626* (2013.01); *H04L 1/0026* (2013.01);
(Continued)

(58) Field of Classification Search
CPC ............... H04B 7/0636; H04B 7/0626; H04W 72/1273; H04W 72/04; H04L 1/0026; H04L 1/18
(Continued)

(56) References Cited

U.S. PATENT DOCUMENTS 9,408,196 B2  8/2016  Li et al.
2008/0192852 A1  8/2008  Kent et al.
(Continued)

FOREIGN PATENT DOCUMENTS

CN  102271032 A  12/2011
CN  102347825 A  2/2012
(Continued)

OTHER PUBLICATIONS

"3rd Generation Partnership Project;Technical Specification Group Radio Access Network; Evolved Universal Terrestrial Radio Access (E-UTRA);Physical layer procedures (Release 12)", 3GPP TS 36.213 V12.4.0, 3rd Generation Partnership Project, Valbonne, France (Dec. 2014).
(Continued)

*Primary Examiner* — Eugene Yun
(74) *Attorney, Agent, or Firm* — Leydig, Voit & Mayer, Ltd.

(57) ABSTRACT

Embodiments of the present application provide a channel state information transmission method. The method includes: receiving downlink data; determining an uplink subframe used to send feedback information of the downlink data, where a first downlink subframe set associated with the uplink subframe includes a first subset and a second subset, and the first subset is a proper subset of the second subset; determining a channel resource used to send the feedback information, where the channel resource includes a first uplink channel resource or a second uplink channel
(Continued)

resource; and if sending of r pieces of CSI is configured to be sent, a codebook size of the feedback information corresponds to the first subset, and the determined channel is the second uplink channel resource, sending the feedback information and t pieces of CSI of the r pieces of CSI on the second uplink channel resource.

23 Claims, 9 Drawing Sheets

Related U.S. Application Data continuation of application No. PCT/CN2015/074783, filed on Mar. 20, 2015.

(51) Int. Cl.
  *H04W 72/04* (2009.01)
  *H04W 72/12* (2009.01)
  *H04L 1/00* (2006.01)

(52) U.S. Cl.
  CPC ............. *H04L 1/18* (2013.01); *H04W 72/04* (2013.01); *H04W 72/1273* (2013.01)

(58) Field of Classification Search
  USPC .......................................................... 455/69
  See application file for complete search history.

(56) References Cited

U.S. PATENT DOCUMENTS

| | | | |
|---|---|---|---|
| 2009/0274230 A1 | 11/2009 | Heath et al. | |
| 2011/0216846 A1 | 9/2011 | Lee et al. | |
| 2012/0039279 A1 | 2/2012 | Chen et al. | |
| 2013/0176924 A1 | 7/2013 | Kishiyama et al. | |
| 2014/0293909 A1 | 10/2014 | Xu et al. | |
| 2015/0009926 A1 | 1/2015 | Seo et al. | |
| 2015/0043452 A1 | 2/2015 | Li et al. | |
| 2015/0043477 A1 | 2/2015 | Nagata et al. | |
| 2015/0245345 A1 | 8/2015 | Gao et al. | |
| 2018/0013479 A1* | 1/2018 | Guan | H04L 1/18 |

FOREIGN PATENT DOCUMENTS

| | | |
|---|---|---|
| CN | 103313368 A | 9/2013 |
| CN | 103427940 A | 12/2013 |
| CN | 103580797 A | 2/2014 |
| CN | 104205920 A | 12/2014 |
| EP | 2775767 A1 | 9/2014 |
| EP | 2838301 A1 | 2/2015 |
| JP | 2012005075 A | 1/2012 |
| JP | 2013535939 A | 9/2013 |
| WO | 2013115623 A1 | 8/2013 |
| WO | 2013148168 A1 | 10/2013 |

OTHER PUBLICATIONS

"3rd Generation Partnership Project;Technical Specification Group Radio Access Network; Evolved Universal Terrestrial Radio Access (E-UTRA);Physical channels and modulation (Release 12)", 3GPP TS 36.211 V12.5.0, 3rd Generation Partnership Project, Valbonne, France (Mar. 2015).

"New WI proposal: LTE Carrier Aggregation Enhancement Beyond 5 Carriers," 3GPP TSG RAN Meeting #66,Maui, Hawaii (US), RP-142286, 3rd Generation Partnership Project, Valbonne, France (Dec. 8-11, 2014).

"Email summary on inter-band TDD CA", 3GPP TSG-RAN WG1 #69, Prague, Czech Republic, R1-122708, 3rd Generation Partnership Project, Valbonne, France (May 21-25, 2012).

* cited by examiner

CHANNEL STATE INFORMATION TRANSMISSION METHOD, USER EQUIPMENT, AND ACCESS NETWORK DEVICE

CROSS-REFERENCE TO RELATED APPLICATIONS

This application is a continuation of U.S. patent application Ser. No. 15/710,350, filed on Sep. 20, 2017, which is a continuation of International Application No. PCT/CN2015/074783, filed on Mar. 20, 2015. All of the afore-mentioned patent applications are hereby incorporated by reference in their entireties.

TECHNICAL FIELD

The present application relates to the communications field, and in particular, to a channel state information (CSI) transmission method, user equipment (UE), and an access network device.

BACKGROUND

With the development of mobile communications technologies, a future mobile communications system provides higher-rate data transmission and wider service coverage. Carrier aggregation (CA) is a frequently used transmission manner and is increasingly widely applied in the field of mobile communications. A concept of CA is that an access network device configures and provides multiple carriers for UE that supports carrier aggregation, to perform uplink and downlink communication, so that higher-rate data transmission is supported. The carriers include a primary carrier and a secondary carrier.

In an existing Long Term Evolution (LTE) CA system, periodic CSI may be independently configured for each aggregation carrier, and the periodic CSI is carried on a physical uplink control channel (PUCCH) and fed back to an access network device. However, because a capacity of the PUCCH is restricted, in each subframe, only one piece of CSI on one carrier can be reported to the access network device. If multiple pieces of periodic CSI are simultaneously configured in a same subframe, UE discards periodic CSI according to a preconfigured priority, and eventually feeds back a piece of CSI with a highest priority to the access network device. In this way, CSI of some carriers is kept from being fed back to the access network device, or a feedback period is prolonged, eventually causing lowered performance of downlink data scheduling. When CA of more carriers is introduced to the CA system, because more acknowledgment (ACK) or negative acknowledgment (NACK) information needs to be fed back, the capacity of the PUCCH is further restricted. Consequently, the foregoing situation becomes severer.

Therefore, how to simultaneously transmit multiple pieces of CSI is currently a problem to be resolved urgently.

SUMMARY

Embodiments of the present application provide a CSI transmission method, user equipment, and an access network device, to resolve at least a prior-art problem that multiple pieces of CSI cannot be simultaneously transmitted, and to provide a related solution in which multiple pieces of CSI are simultaneously transmitted.

To achieve the foregoing objective, the following technical solutions are used in the embodiments of the present application:

According to a first aspect, a channel state information CSI transmission method is provided, where the method includes:

receiving, by user equipment UE, downlink data from an access network device;

determining, by the UE, an uplink subframe used to send feedback information of the downlink data, where a first downlink subframe set associated with the uplink subframe includes a first subset and a second subset, and the first subset is a proper subset of the second subset;

determining, by the UE, a channel resource used to send the feedback information, where the channel resource includes a first uplink channel resource or a second uplink channel resource, the first uplink channel resource is a resource in a channel format with a codebook size p, and the second uplink channel resource is a resource in a channel format with a codebook size q, where $q > p$, $q \geq q1$, $p \geq p1$, $p1$ is a codebook size that is of feedback information and that corresponds to the first subset, $q1$ is a codebook size that is of feedback information and that corresponds to the second subset, and $p$, $q$, $p1$, and $q1$ are all positive integers; and if sending of r pieces of CSI is configured in the uplink subframe for the UE, a codebook size of the feedback information corresponds to the first subset, and the channel resource determined by the UE is the second uplink channel resource, sending, by the UE, the feedback information and t pieces of CSI of the r pieces of CSI on the second uplink channel resource, where $r \geq 2$, $2 < t \leq r$, and r and t are both positive integers.

With reference to the first aspect, in a first possible implementation of the first aspect, after the determining, by the UE, a channel resource used to send the feedback information, the method further includes:

if sending of r pieces of CSI is configured in the uplink subframe for the UE, a codebook size of the feedback information corresponds to the first subset, and the channel resource determined by the UE is the first uplink channel resource, sending, by the UE, the feedback information and s pieces of CSI of the r pieces of CSI on the first uplink channel resource, where $0 \leq s \leq r$, and s is a positive integer.

With reference to the first aspect or the first possible implementation of the first aspect, in a second possible implementation of the first aspect, after the determining, by the UE, a channel resource used to send the feedback information, the method further includes:

if sending of r pieces of CSI is configured in the uplink subframe for the UE, a codebook size of the feedback information corresponds to the second subset, and the channel resource determined by the UE is the second uplink channel resource, sending, by the UE, the feedback information and s pieces of CSI of the r pieces of CSI on the second uplink channel resource, where $0 \leq s \leq r$, and s is a positive integer.

With reference to any one of the first aspect to the second possible implementation of the first aspect, in a third possible implementation of the first aspect, the receiving, by UE, downlink data from an access network device includes:

receiving, by the UE, the downlink data in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

With reference to the third possible implementation of the first aspect, in a fourth possible implementation of the first aspect, if sending of the r pieces of CSI is configured in the uplink subframe for the UE, and the second downlink subframe set is a subset of the first subset, the channel resource determined by the UE is the first uplink channel resource or the second uplink channel resource; or if sending of the r pieces of CSI is configured in the uplink subframe for the UE, the second downlink subframe set includes a downlink subframe in the first subset and a downlink subframe that belongs to the second subset but does not belong to the first subset, and the second downlink subframe set is a subset of the second subset, the channel resource determined by the UE is the second uplink channel resource.

With reference to any one of the first aspect to the fourth possible implementation of the first aspect, in a fifth possible implementation of the first aspect, before the determining, by the UE, a channel resource used to send the feedback information, the method further includes:

receiving, by the UE, resource indication information from the access network device, where the resource indication information is used to indicate the channel resource for sending the feedback information; and the determining, by the UE, a channel resource used to send the feedback information includes:

determining, by the UE according to the resource indication information and a mapping relationship that is between different states in a state set in the resource indication information and different channel resources in a channel resource set and that is preconfigured by the access network device for the UE, the channel resource used to send the feedback information, where the channel resource set includes the first uplink channel resource and the second uplink channel resource.

With reference to the fifth possible implementation of the first aspect, in a sixth possible implementation of the first aspect, the resource indication information is further used to indicate the codebook size of the feedback information; and the method further includes:

determining, by the UE, the codebook size of the feedback information according to the resource indication information and a mapping relationship that is between the different states in the state set in the resource indication information and different codebook sizes in a codebook size set and that is preconfigured by the access network device for the UE, where the codebook size set includes the codebook size corresponding to the first subset and the codebook size corresponding to the second subset.

With reference to the fifth possible implementation of the first aspect, in a seventh possible implementation of the first aspect, the resource indication information is further used to indicate a subset corresponding to the codebook size of the feedback information; and the method further includes:

determining, by the UE according to the resource indication information and a mapping relationship that is between the different states in the state set in the resource indication information and subsets corresponding to different codebook sizes in a subset set corresponding to a codebook size and that is preconfigured by the access network device for the UE, the subset corresponding to the codebook size of the feedback information, where the subset set corresponding to the codebook size includes the first subset and the second subset.

With reference to any one of the third possible implementation of the first aspect to the seventh possible implementation of the first aspect, in an eighth possible implementation of the first aspect, after the determining, by the UE, a channel resource used to send the feedback information, the method further includes:

if CSI sending is not configured in the uplink subframe for the UE, the codebook size of the feedback information corresponds to the first subset, and the channel resource determined by the UE is the first uplink channel resource, sending, by the UE, the feedback information on the first uplink channel resource; or if CSI sending is not configured in the uplink subframe for the UE, the codebook size of the feedback information corresponds to the second subset, and the channel resource determined by the UE is the second uplink channel resource, sending, by the UE, the feedback information on the second uplink channel resource.

With reference to the eighth possible implementation of the first aspect, in a ninth possible implementation of the first aspect, if CSI sending is not configured in the uplink subframe for the UE, and the second downlink subframe set is the subset of the first subset, the channel resource determined by the UE is the first uplink channel resource; or if CSI sending is not configured in the uplink subframe for the UE, the second downlink subframe set includes the downlink subframe in the first subset and the downlink subframe that belongs to the second subset but does not belong to the first subset, and the second downlink subframe set is the subset of the second subset, the channel resource determined by the UE is the second uplink channel resource.

According to a second aspect, user equipment UE is provided, where the UE includes: a receiving module, a processing module, and a sending module, where the receiving module is configured to receive downlink data from an access network device;

the processing module is configured to determine an uplink subframe used to send feedback information of the downlink data, where a first downlink subframe set associated with the uplink subframe includes a first subset and a second subset, and the first subset is a proper subset of the second subset;

the processing module is further configured to determine a channel resource used to send the feedback information, where the channel resource includes a first uplink channel resource or a second uplink channel resource, the first uplink channel resource is a resource in a channel format with a codebook size p, and the second uplink channel resource is a resource in a channel format with a codebook size q, where $q>p$, $q \geq q1$, $p \geq p1$, p1 is a codebook size that is of feedback information and that corresponds to the first subset, q1 is a codebook size that is of feedback information and that corresponds to the second subset, and p, q, p1, and q1 are all positive integers; and the sending module is configured to: if sending of r pieces of channel state information CSI is configured in the uplink subframe for the UE, a codebook size of the feedback information corresponds to the first subset, and the channel resource determined by the processing module is the second uplink channel resource, send the feedback information and t pieces of CSI of the r pieces of CSI on the second uplink channel resource, where $r \geq 2$, $2 \leq t \leq r$, and r and t are both positive integers.

With reference to the second aspect, in a first possible implementation of the second aspect, the sending module is further configured to: after the processing module determines the channel resource used to send the feedback information, if sending of r pieces of CSI is configured in the uplink subframe for the UE, a codebook size of the feedback information corresponds to the first subset, and the channel resource determined by the processing module is the first uplink channel resource, send the feedback information and s pieces of CSI of the r pieces of CSI on the first uplink channel resource, where 0≤s≤r, and s is a positive integer.

With reference to the second aspect or the first possible implementation of the second aspect, in a second possible implementation of the second aspect, the sending module is further configured to: after the processing module determines the channel resource used to send the feedback information, if sending of r pieces of CSI is configured in the uplink subframe for the UE, a codebook size of the feedback information corresponds to the second subset, and the channel resource determined by the processing module is the second uplink channel resource, send the feedback information and s pieces of CSI of the r pieces of CSI on the second uplink channel resource, where 0≤s≤r, and s is a positive integer.

With reference to any one of the second aspect to the second possible implementation of the second aspect, in a third possible implementation of the second aspect, the receiving module is specifically configured to:

receive the downlink data in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

With reference to the third possible implementation of the second aspect, in a fourth possible implementation of the second aspect, if sending of the r pieces of CSI is configured in the uplink subframe for the UE, and the second downlink subframe set is a subset of the first subset, the channel resource determined by the processing module is the first uplink channel resource or the second uplink channel resource; or if sending of the r pieces of CSI is configured in the uplink subframe for the UE, the second downlink subframe set includes a downlink subframe in the first subset and a downlink subframe that belongs to the second subset but does not belong to the first subset, and the second downlink subframe set is a subset of the second subset, the channel resource determined by the processing module is the second uplink channel resource.

With reference to any one of the second aspect to the fourth possible implementation of the second aspect, in a fifth possible implementation of the second aspect, the receiving module is further configured to: before the processing module determines the channel resource used to send the feedback information, receive resource indication information from the access network device, where the resource indication information is used to indicate the channel resource for sending the feedback information; and the determining module is specifically configured to:

determine, according to the resource indication information and a mapping relationship that is between different states in a state set in the resource indication information and different channel resources in a channel resource set and that is preconfigured by the access network device for the UE, the channel resource used to send the feedback information, where the channel resource set includes the first uplink channel resource and the second uplink channel resource.

With reference to the fifth possible implementation of the second aspect, in a sixth possible implementation of the second aspect, the resource indication information is further used to indicate the codebook size of the feedback information; and the processing module is further configured to determine the codebook size of the feedback information according to the resource indication information and a mapping relationship that is between the different states in the state set in the resource indication information and different codebook sizes in a codebook size set and that is preconfigured by the access network device for the UE, where the codebook size set includes the codebook size corresponding to the first subset and the codebook size corresponding to the second subset.

With reference to the fifth possible implementation of the second aspect, in a seventh possible implementation of the second aspect, the resource indication information is further used to indicate a subset corresponding to the codebook size of the feedback information; and the processing module is further configured to determine, according to the resource indication information and a mapping relationship that is between the different states in the state set in the resource indication information and subsets corresponding to different codebook sizes in a subset set corresponding to a codebook size and that is preconfigured by the access network device for the UE, the subset corresponding to the codebook size of the feedback information, where the subset set corresponding to the codebook size includes the first subset and the second subset.

With reference to any one of the third possible implementation of the second aspect to the seventh possible implementation of the second aspect, in an eighth possible implementation of the second aspect, the sending module is further configured to: after the processing module determines the channel resource used to send the feedback information, if CSI sending is not configured in the uplink subframe for the UE, the codebook size of the feedback information corresponds to the first subset, and the channel resource determined by the processing module is the first uplink channel resource, send the feedback information on the first uplink channel resource; or the sending module is further configured to: after the processing module determines the channel resource used to send the feedback information, if CSI sending is not configured in the uplink subframe for the UE, the codebook size of the feedback information corresponds to the second subset, and the channel resource determined by the processing module is the second uplink channel resource, send the feedback information on the second uplink channel resource.

With reference to the eighth possible implementation of the second aspect, in a ninth possible implementation of the second aspect, if CSI sending is not configured in the uplink subframe for the UE, and the second downlink subframe set is the subset of the first subset, the channel resource determined by the processing module is the first uplink channel resource; or if CSI sending is not configured in the uplink subframe for the UE, the second downlink subframe set includes the downlink subframe in the first subset and the downlink subframe that belongs to the second subset but does not belong to the first subset, and the second downlink subframe set is the subset of the second subset, the channel resource determined by the processing module is the second uplink channel resource.

Based on the CSI transmission method and the UE that are provided in the embodiments of the present application, in the embodiments of the present application, when sending of the r pieces of CSI is configured in the uplink subframe for the UE, the codebook size of the feedback information corresponds to the first subset, and the channel resource determined by the UE is the second uplink channel resource, the UE needs to send only the feedback information on the second uplink channel resource according to the codebook size that is of feedback information and that corresponds to the first subset. Therefore, considering that the codebook size that is of feedback information and that corresponds to the first subset is not greater than a codebook size of a first uplink channel, and the codebook size of the first uplink channel is less than a codebook size of a second uplink channel, a maximum quantity of bits of feedback information that can be carried on the second uplink channel resource is not restricted, and the UE not only can send the feedback information on the second uplink channel resource, but also can send the t pieces of CSI of the r pieces of CSI on the second uplink channel resource, where r≥2 and 2≤t≤r. That is, the UE sends the feedback information and the t pieces of CSI of the r pieces of CSI on the second uplink channel resource, where r≥2 and 2≤t≤r, so that multiple pieces of CSI are simultaneously transmitted.

According to a third aspect, a channel state information CSI transmission method is provided, where the method includes:

sending, by an access network device, downlink data to user equipment UE;

determining, by the access network device, an uplink subframe used to receive feedback information of the downlink data, where a first downlink subframe set associated with the uplink subframe includes a first subset and a second subset, and the first subset is a proper subset of the second subset;

determining, by the access network device, a channel resource used to receive the feedback information, where the channel resource includes a first uplink channel resource or a second uplink channel resource, the first uplink channel resource is a resource in a channel format with a codebook size p, and the second uplink channel resource is a resource in a channel format with a codebook size q, where q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers; and if receiving of r pieces of CSI is configured in the uplink subframe for the access network device, a codebook size of the feedback information corresponds to the first subset, and the channel resource determined by the access network device is the second uplink channel resource, receiving, by the access network device, the feedback information and t pieces of CSI of the r pieces of CSI on the second uplink channel resource, where r≥2, 2≤t<r, and p1, r, and t are all positive integers.

With reference to the third aspect, in a first possible implementation of the third aspect, after the determining, by the access network device, a channel resource used to receive the feedback information, the method further includes:

if receiving of r pieces of CSI is configured in the uplink subframe for the access network device, a codebook size of the feedback information corresponds to the first subset, and the channel resource determined by the access network device is the first uplink channel resource, receiving, by the access network device, the feedback information and s pieces of CSI of the r pieces of CSI on the first uplink channel resource, where 0≤s≤r, and s is a positive integer.

With reference to the third aspect or the first possible implementation of the third aspect, in a second possible implementation of the third aspect, after the determining, by the access network device, a channel resource used to receive the feedback information, the method further includes:

if receiving of r pieces of CSI is configured in the uplink subframe for the access network device, a codebook size of the feedback information corresponds to the second subset, and the channel resource determined by the access network device is the second uplink channel resource, receiving, by the access network device, the feedback information and s pieces of CSI of the r pieces of CSI on the second uplink channel resource, where 0≤s≤r, and q1 and s are positive integers.

With reference to any one of the third aspect to the second possible implementation of the third aspect, in a third possible implementation of the third aspect, the sending, by an access network device, downlink data to user equipment UE includes:

sending, by the access network device, the downlink data to the UE in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

With reference to the third possible implementation of the third aspect, in a fourth possible implementation of the third aspect, if receiving of the r pieces of CSI is configured in the uplink subframe for the access network device, and the second downlink subframe set is a subset of the first subset, the channel resource determined by the access network device is the first uplink channel resource or the second uplink channel resource; or if receiving of the r pieces of CSI is configured in the uplink subframe for the access network device, the second downlink subframe set includes a downlink subframe in the first subset and a downlink subframe that belongs to the second subset but does not belong to the first subset, and the second downlink subframe set is a subset of the second subset, the channel resource determined by the access network device is the second uplink channel resource.

With reference to any one of the third aspect to the fourth possible implementation of the third aspect, in a fifth possible implementation of the third aspect, after the determining, by the access network device, a channel resource used to receive the feedback information, the method further includes:

sending, by the access network device, resource indication information to the UE, where the resource indication information is used to indicate the channel resource for transmitting the feedback information.

With reference to the fifth possible implementation of the third aspect, in a sixth possible implementation of the third aspect, the resource indication information is further used to indicate the codebook size of the feedback information.

With reference to the fifth possible implementation of the third aspect, in a seventh possible implementation of the third aspect, the resource indication information is further used to indicate a subset corresponding to the codebook size of the feedback information.

With reference to any one of the third possible implementation of the third aspect to the seventh possible implementation of the third aspect, in an eighth possible implementation of the third aspect, after the determining, by the access network device, a channel resource used to receive the feedback information, the method further includes:

if CSI receiving is not configured in the uplink subframe for the access network device, the codebook size of the feedback information corresponds to the first subset, and the channel resource determined by the access network device is the first uplink channel resource, receiving, by the access network device, the feedback information on the first uplink channel resource; or if CSI receiving is not configured in the uplink subframe for the access network device, the codebook size of the feedback information corresponds to the second subset, and the channel resource determined by the access network device is the second uplink channel resource, receiving, by the access network device, the feedback information on the second uplink channel resource.

With reference to the eighth possible implementation of the third aspect, in a ninth possible implementation of the third aspect, if CSI receiving is not configured in the uplink subframe for the access network device, and the second downlink subframe set is the subset of the first subset, the channel resource determined by the access network device is the first uplink channel resource; or if CSI sending is not configured in the uplink subframe for the access network device, the second downlink subframe set includes the downlink subframe in the first subset and the downlink subframe that belongs to the second subset but does not belong to the first subset, and the second downlink subframe set is the subset of the second subset, the channel resource determined by the access network device is the second uplink channel resource.

According to a fourth aspect, an access network device is provided, where the access network device includes: a sending module, a processing module, and a receiving module, where the sending module is configured to send downlink data to user equipment UE;

the processing module is configured to determine an uplink subframe used to receive feedback information of the downlink data, where a first downlink subframe set associated with the uplink subframe includes a first subset and a second subset, and the first subset is a proper subset of the second subset;

the processing module is further configured to determine a channel resource used to receive the feedback information, where the channel resource includes a first uplink channel resource or a second uplink channel resource, the first uplink channel resource is a resource in a channel format with a codebook size p, and the second uplink channel resource is a resource in a channel format with a codebook size q, where $q>p$, $q \geq q1$, $p \geq p1$, $p1$ is a codebook size that is of feedback information and that corresponds to the first subset, $q1$ is a codebook size that is of feedback information and that corresponds to the second subset, and p, q, p1, and q1 are all positive integers; and the receiving module is configured to: if receiving of r pieces of channel state information CSI is configured in the uplink subframe for the access network device, a codebook size of the feedback information corresponds to the first subset, and the channel resource determined by the processing module is the second uplink channel resource, receive the feedback information and t pieces of CSI of the r pieces of CSI on the second uplink channel resource, where $r \geq 2$, $2 \leq t \leq r$, and p1, r, and t are all positive integers.

With reference to the fourth aspect, in a first possible implementation of the fourth aspect, the receiving module is further configured to: after the processing module determines the channel resource used to receive the feedback information, if receiving of r pieces of CSI is configured in the uplink subframe for the access network device, a codebook size of the feedback information corresponds to the first subset, and the channel resource determined by the processing module is the first uplink channel resource, receive the feedback information and s pieces of CSI of the r pieces of CSI on the first uplink channel resource, where $0 \leq s \leq r$, and s is a positive integer.

With reference to the fourth aspect or the first possible implementation of the fourth aspect, in a second possible implementation of the fourth aspect, the receiving module is further configured to: after the processing module determines the channel resource used to receive the feedback information, if receiving of r pieces of CSI is configured in the uplink subframe for the access network device, a codebook size of the feedback information corresponds to the second subset, and the channel resource determined by the processing module is the second uplink channel resource, receive the feedback information and s pieces of CSI of the r pieces of CSI on the second uplink channel resource, where $0 \leq s \leq r$, and q1 and s are positive integers.

With reference to any one of the fourth aspect to the second possible implementation of the fourth aspect, in a third possible implementation of the fourth aspect, the sending module is specifically configured to:

send the downlink data to the UE in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

With reference to the third possible implementation of the fourth aspect, in a fourth possible implementation of the fourth aspect, if receiving of the r pieces of CSI is configured in the uplink subframe for the access network device, and the second downlink subframe set is a subset of the first subset, the channel resource determined by the processing module is the first uplink channel resource or the second uplink channel resource; or if receiving of the r pieces of CSI is configured in the uplink subframe for the access network device, the second downlink subframe set includes a downlink subframe in the first subset and a downlink subframe that belongs to the second subset but does not belong to the first subset, and the second downlink subframe set is a subset of the second subset, the channel resource determined by the processing module is the second uplink channel resource.

With reference to any one of the fourth aspect to the fourth possible implementation of the fourth aspect, in a fifth possible implementation of the fourth aspect, the sending module is further configured to: after the processing module determines the channel resource used to receive the feedback information, send resource indication information to the UE, where the resource indication information is used to indicate the channel resource for transmitting the feedback information.

With reference to the fifth possible implementation of the fourth aspect, in a sixth possible implementation of the fourth aspect, the resource indication information is further used to indicate the codebook size of the feedback information.

With reference to the fifth possible implementation of the fourth aspect, in a seventh possible implementation of the fourth aspect, the resource indication information is further used to indicate a subset corresponding to the codebook size of the feedback information.

With reference to any one of the third possible implementation of the fourth aspect to the seventh possible implementation of the fourth aspect, in an eighth possible implementation of the fourth aspect, the receiving module is further configured to: after the processing module determines the channel resource used to receive the feedback information, if CSI receiving is not configured in the uplink subframe for the access network device, the codebook size of the feedback information corresponds to the first subset, and the channel resource determined by the processing module is the first uplink channel resource, receive the feedback information on the first uplink channel resource; or the receiving module is further configured to: after the processing module determines the channel resource used to receive the feedback information, if CSI receiving is not configured in the uplink subframe for the access network device, the codebook size of the feedback information corresponds to the second subset, and the channel resource determined by the processing module is the second uplink channel resource, receive the feedback information on the second uplink channel resource.

With reference to the eighth possible implementation of the fourth aspect, in a ninth possible implementation of the fourth aspect, if CSI receiving is not configured in the uplink subframe for the access network device, and the second downlink subframe set is the subset of the first subset, the channel resource determined by the processing module is the first uplink channel resource; or if CSI sending is not configured in the uplink subframe for the access network device, the second downlink subframe set includes the downlink subframe in the first subset and the downlink subframe that belongs to the second subset but does not belong to the first subset, and the second downlink subframe set is the subset of the second subset, the channel resource determined by the processing module is the second uplink channel resource.

Based on the CSI transmission method and the access network device that are provided in the embodiments of the present application, in the embodiments of the present application, when sending of the r pieces of CSI is configured in the uplink subframe for the UE, the codebook size of the feedback information corresponds to the first subset, and the channel resource determined by the UE is the second uplink channel resource, the access network device needs to receive only the feedback information on the second uplink channel resource according to the codebook size that is of feedback information and that corresponds to the first subset. Therefore, considering that the codebook size that is of feedback information and that corresponds to the first subset is not greater than a codebook size of a first uplink channel, and the codebook size of the first uplink channel is less than a codebook size of a second uplink channel, a maximum quantity of bits of feedback information that can be carried on the second uplink channel resource is not restricted, and the access network device not only can receive the feedback information on the second uplink channel resource, but also can receive the t pieces of CSI of the r pieces of CSI on the second uplink channel resource, where r≥2 and 2≤t≤r. That is, the access network device receives the feedback information and the t pieces of CSI of the r pieces of CSI on the second uplink channel resource, where r≥2 and 2≤t≤r, so that multiple pieces of CSI are simultaneously transmitted.

DESCRIPTION OF EMBODIMENTS

Figure 1:
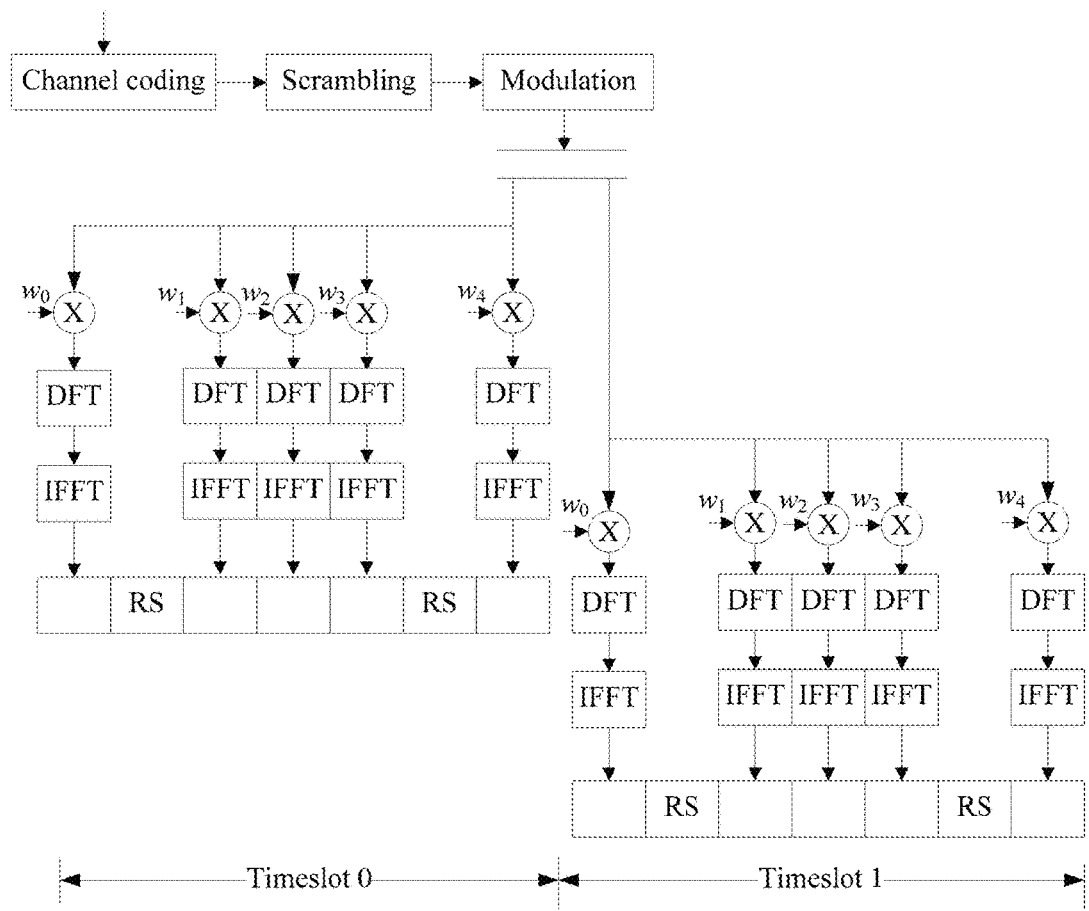
FIG. 1 is a schematic structural diagram of a channel in a PUCCH format 3 according to an embodiment of the present application.

To make descriptions of the following embodiments clear and concise, brief descriptions of related backgrounds are first provided as follows.

In an LTE system, in a downlink, based on orthogonal frequency division multiple access (OFDMA), a time-frequency resource is divided into an OFDMA symbol (referred to as a time domain symbol below) in a time domain dimension and a subcarrier in a frequency domain dimension. In an uplink, based on single carrier frequency division multiple access (SC-FDMA), a time-frequency resource is divided into an SC-FDMA symbol (referred to as a time domain symbol below) in a time domain dimension and a subcarrier in a frequency domain dimension. A minimum resource granularity is referred to as a resource element (RE), and represents a time-frequency grid including a time domain symbol in a time domain and a subcarrier in a frequency domain.

In the LTE system, scheduling for service transmission is based on a base station, a basic time unit of the scheduling is one subframe, and the subframe includes multiple time domain symbols. A specific scheduling procedure includes: The base station sends scheduling information of a physical downlink shared channel (PDSCH) or a physical uplink shared channel (PUSCH) by using a control channel (for example, a physical downlink control channel (PDCCH) or an enhanced physical downlink control channel (Enhanced PDCCH, EPDCCH)), where the scheduling information includes control information such as resource allocation information and an adjusting and coding scheme; and UE detects the control channel in a subframe, and receives downlink data or sends uplink data according to the scheduling information carried on the detected control channel.

The LTE system supports two duplex modes: frequency division duplex (FDD) and time division duplex (TDD). For an FDD system, a downlink and an uplink are transmitted on different carriers. For a TDD system, an uplink and a downlink are transmitted on a same carrier at different times. Specifically, one carrier includes a downlink subframe, an uplink subframe, and a special subframe. The special subframe includes three parts: a downlink pilot timeslot (DwPTS), a guard period (GP), and an uplink pilot timeslot (UpPTS). The GP is mainly used to compensate for a downlink-to-uplink conversion time and a propagation delay. In addition, downlink data can be transmitted in the DwPTS, but uplink data cannot be transmitted in the UpPTS. The LTE system currently supports seven different TDD uplink-downlink configurations, as shown in Table 1. D represents the downlink subframe, S represents the special subframe, and U represents the uplink subframe.

TABLE 1

| TDD uplink-downlink configuration | Downlink-to-uplink conversion period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The LTE system uses a hybrid automatic repeat request (HARD) mechanism. A downlink is used as an example. After UE receives data carried on a PDSCH, if the data is received successfully, the UE feeds back ACK information on a PUCCH. If the data fails to be received, the UE feeds back NACK information on a PUCCH. For FDD, after receiving, in a subframe n−4, the data carried on the PDSCH, the UE feeds back the ACK information or the NACK information in a subframe n. For TDD, a time sequence relationship between a PDSCH and ACK information or NACK information that is corresponding to the PDSCH is shown in Table 2. A subframe marked with a number is an uplink subframe n used to feed back ACK information or NACK information. The marked number indicates that ACK information or NACK information that is corresponding to a PDSCH of a set of downlink subframes n−k (k belongs to K) needs to be fed back in the uplink subframe n. For example, K={7, 6} in a subframe n=2 with an uplink-downlink configuration 1 indicates that the uplink subframe n=2 is used to feed back ACK information or NACK information that is corresponding to PDSCHs of two downlink subframes: n−7 and n−6. Specifically, n−7 is a downlink subframe 5, and n−6 is a downlink subframe 6.

TABLE 2

| TDD uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The LTE system further supports a CA technology. That is, an access network device configures and provides multiple carriers for UE that supports carrier aggregation, to perform uplink and downlink communication, so that higher-rate data transmission is supported. During CA, multiple carriers from a base station are synchronous in terms of a sending time, and UE may detect and schedule a PDCCH of each carrier and a corresponding PDSCH. A specific detection process of each carrier is similar to the foregoing detection process of a single carrier. The LTE system supports FDD CA, TDD CA, and FDD+TDD CA. TDD CA further includes TDD CA of a same uplink-downlink configuration and TDD CA of different uplink-downlink configurations. In a CA mode, there is one primary carrier and at least one secondary carrier, and ACK information or NACK information that is carried on a PUCCH is sent on only a primary carrier of the UE.

In the CA mode, one transmission mode of the PUCCH is a PUCCH format 3 mode. As shown in FIG. 1, a discrete Fourier transform (Discrete Fourier Transform, DFT for short)-spread-orthogonal frequency division multiplexing (DFT-Spread-OFDM, DFT-S-OFDM for short) sending structure is used in the PUCCH format 3 mode, and may support transmission of at most 22 uncoded bits. For example, the TDD uplink-downlink configuration 2 prevalently deployed in a current network is used as an example. An uplink subframe 2 on one carrier may support feedback of four ACK information bits or NACK information bits, and CA with the TDD uplink-downlink configuration 2 of five carriers may support feedback of 20 ACK information bits or NACK information bits. Specifically, 48 coded bits are generated after Reed Muller (Reed Muller, RM for short) channel coding is performed on original ACK information or NACK information bits (for example, 20 bits), are then scrambled, and are modulated into 24 quadrature phase shift keying (Quadrature Phase Shift Keying, QPSK for short) symbols. The 24 quadrature phase shift keying symbols are put into two timeslots of one subframe, with 12 QPSK symbols in each timeslot. Specifically, the 12 QPSK symbols are put on 12 consecutive subcarriers on one time domain symbol of the timeslot, that is, occupy 12 subcarriers on one time domain symbol of a resource block (Resource Block, RB for short). Then, for each timeslot, orthogonal cover code (Orthogonal Cover Code, OCC for short) spreading with a length of 5 is performed in the time domain, and five time domain symbols in one RB are separately occupied. Code division multiplexing may be performed, in one RB, on different UEs by using different OCCs, and remaining two symbols are used to carry a reference signal (Reference Signal, RS for short). Finally, DFT precoding is performed, and information obtained after the DFT precoding is sent to the base station.

In a current LTE system, if a transmission mode is set to the PUCCH format 3 mode, specific data scheduling and a specific manner of indicating a PUCCH channel resource are as follows:

An example in which five FDD downlink carriers are configured is used. If UE receives only scheduling information that is of a PDSCH on a primary carrier and that is carried on a primary PDCCH, ACK information or NACK information is fed back by using a PUCCH format 1a/1b, and a channel resource in the PUCCH format 1a/1b implicitly corresponds to a control channel element (Control Channel Element, CCE for short) index of the primary PDCCH. If the UE receives only scheduling information that is of a PDSCH on a secondary carrier and that is carried on a secondary PDCCH, ACK information or NACK information is fed back by using the PUCCH format 3, and a channel resource in the PUCCH format 3 is explicitly indicated by using a 2-bit field on the secondary PDCCH. Specifically, four channel resources in the PUCCH format 3 are pre-allocated according to high layer radio resource control (Radio Resource Control, RRC for short) signaling. Specifically, two bits in the secondary PDCCH are used to indicate which one of the four channel resources is to be used during each time of scheduling.

The current PUCCH format 3 mode further supports feedback of ACK information or NACK information through a TDD single carrier. A specific procedure is: If UE receives only scheduling information that is of a PDSCH on a primary carrier and that is carried on a primary PDCCH, and a downlink assignment index (Downlink Assignment Index, DAI for short) field on the primary PDCCH indicates '1', ACK information or NACK information is fed back by using the PUCCH format 1a/1b, and a channel resource in the PUCCH format 1a/1b implicitly corresponds to a CCE index of the primary PDCCH. If UE receives only scheduling information that is of a PDSCH on a primary carrier and that is carried on a primary PDCCH, and a DAI field on the primary PDCCH indicates a value greater than '1', ACK information or NACK information is fed back by using the PUCCH format 3, and a channel resource in the PUCCH format 3 is explicitly indicated by using a 2-bit field that is on the primary PDCCH and that includes a DAI value greater than 1.

The foregoing ACK information or NACK information transmission that supports a fallback mode in the PUCCH format 1a/1b is intended to reduce overheads of the PUCCH format 3. Because in the PUCCH format 3, code division multiplexing can be performed, in one RB, on only 5 UEs, but in the PUCCH format 1a/1b, code division multiplexing may be performed, in one RB, on at most 36 UEs, resource overheads of the PUCCH format 3 can be minimized.

Next, a system architecture and a scenario in the embodiments of the present application are provided in the following.

Figure 2:
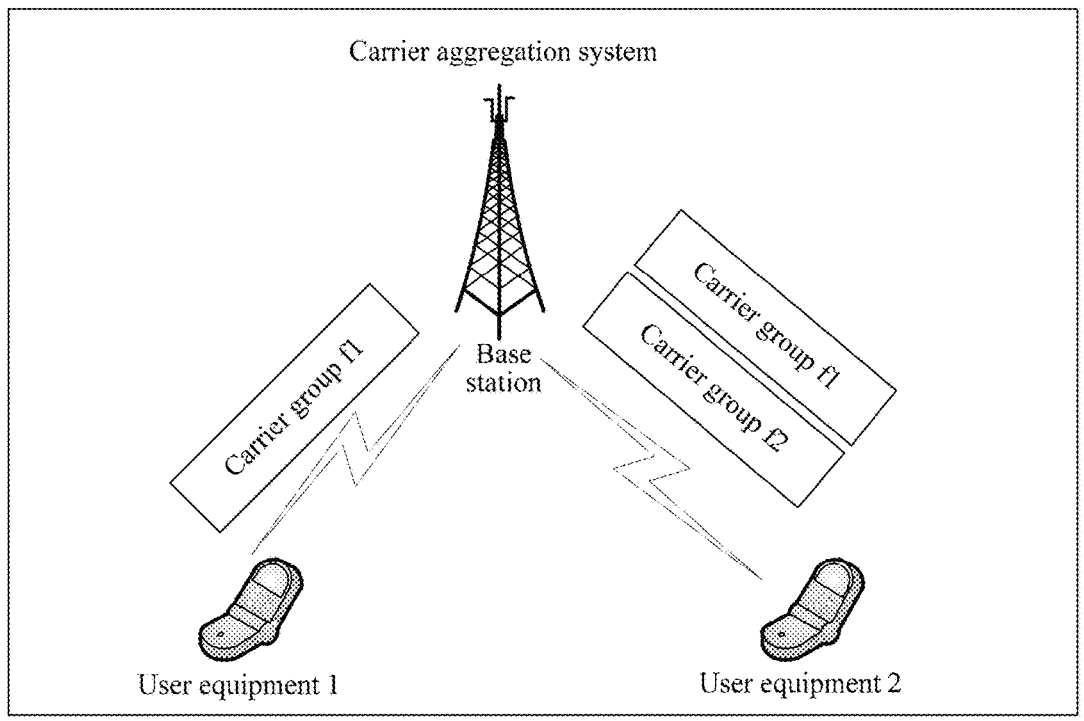
FIG. 2 is a schematic architectural diagram of a CA system according to an embodiment of the present application.

An example in which an access network device in the embodiments of the present application is specifically a base station is used. As shown in FIG. 2, the system architecture in the embodiments of the present application is still based on a current CA architecture, and includes the base station and multiple UEs. In the CA architecture, CA of more carriers may be introduced, or current CA of five carriers may be maintained. However, the CA architecture may support multiple carriers with an uplink-downlink configuration 5, or support more than two TDD carriers having only a downlink subframe, or support a combination of carriers with different uplink-downlink configurations. This is not specifically limited in the embodiments of the present application.

It should be noted that the access network device in the embodiments of the present application may be another device, for example, a wireless network controller. This is not specifically limited in the embodiments of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Embodiment 1

Figure 3:
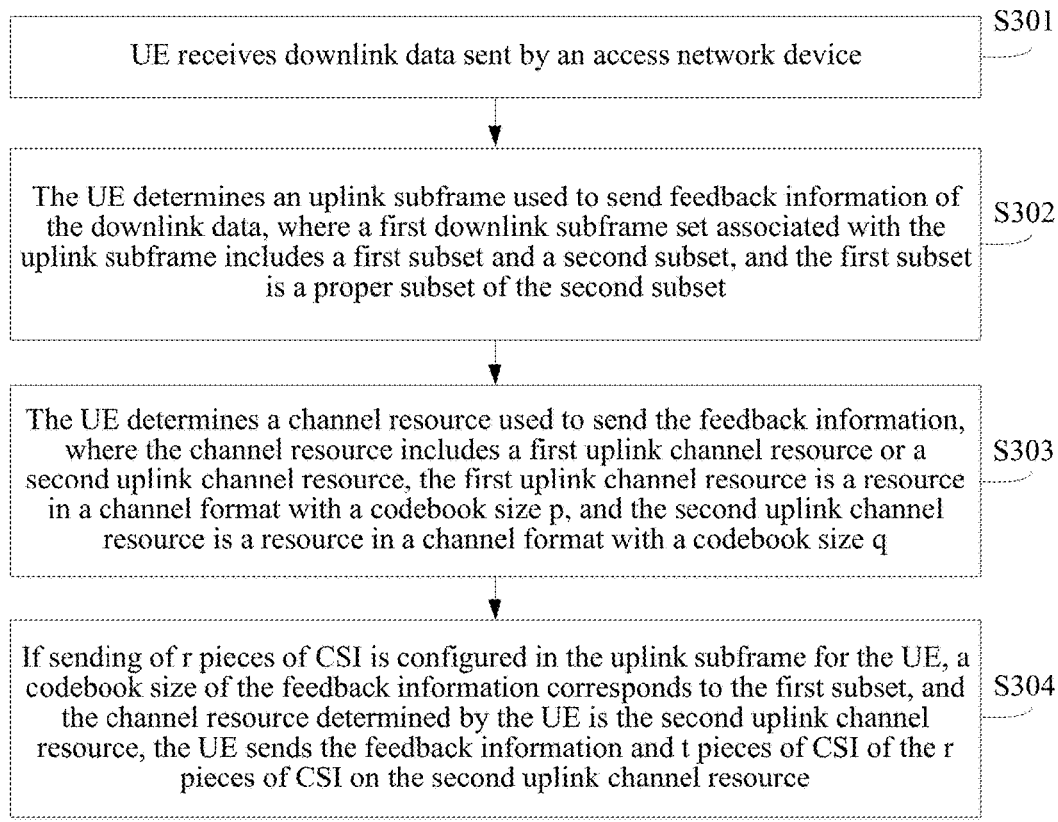
FIG. 3 is a schematic flowchart 1 of a CSI transmission method according to an embodiment of the present application.

This embodiment of the present application provides a CSI transmission method that is specifically applied to UE shown in FIG. 2. As shown in FIG. 3, the CSI transmission method includes the following steps.

S301. The UE receives downlink data from an access network device.

S302. The UE determines an uplink subframe used to send feedback information of the downlink data. A first downlink subframe set associated with the uplink subframe includes a first subset and a second subset, and the first subset is a proper subset of the second subset.

S303. The UE determines a channel resource used to send the feedback information. The channel resource includes a first uplink channel resource or a second uplink channel resource, the first uplink channel resource is a resource in a channel format with a codebook size p, and the second uplink channel resource is a resource in a channel format with a codebook size q, where q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers.

S304. If sending of r pieces of CSI is configured in the uplink subframe for the UE, a codebook size of the feedback information corresponds to the first subset, and the channel resource determined by the UE is the second uplink channel resource, the UE sends the feedback information and t pieces of CSI of the r pieces of CSI on the second uplink channel resource, where r≥2, 2≤t≤r, and p1, r, and t are all positive integers.

Specifically, in step S302 in this embodiment of the present application, the feedback information is used to indicate whether the UE successfully receives the downlink data. For example, if the downlink data is successfully received, an ACK may be used as an indication for the feedback information. If the downlink data is not successfully received, an NACK may be used as an indication for the feedback information. Certainly, the feedback information in this embodiment of the present application may be other information. This is not limited in this embodiment of the present application.

Specifically, after receiving the downlink data from the access network device, the UE may determine, by using a preconfigured time sequence or timing correspondence between a downlink subframe and an uplink subframe, the uplink subframe used to send the feedback information, that is, determine, according to a preconfigured uplink-downlink subframe configuration, the uplink subframe used to send the feedback information. For example, the uplink subframe for sending the feedback information may be determined according to Table 2.

The first downlink subframe set associated with the uplink subframe specifically means that the feedback information corresponding to the downlink data scheduled in the first downlink subframe set needs to be fed back in the uplink subframe. The first downlink subframe set is determined by using the preconfigured time sequence or timing correspondence between a downlink subframe and an uplink subframe, that is, determined according to the preconfigured uplink-downlink subframe configuration. For example, the first downlink subframe set associated with the uplink subframe may be determined according to Table 2.

It should be noted that, for TDD, the downlink subframe mentioned herein includes a real downlink subframe and a special subframe. As described above, in the special subframe, downlink data can be transmitted, but uplink data cannot be transmitted. The downlink data transmitted in the special subframe also needs to have corresponding feedback information. Therefore, the special subframe may be considered as the downlink subframe and used in this embodiment of the present application.

Specifically, in this embodiment of the present application, a set of all downlink subframes associated with the uplink subframe used to transmit the feedback information is referred to as the first downlink subframe set, and the first downlink subframe set includes at least two subsets, that is, the first subset and the second subset. All the downlink subframes are all downlink subframes that are configured to send feedback information on the uplink subframe and that are on all carriers configured for the UE. For example, if 15 carriers are configured by the access network device for the UE, and a same uplink-downlink subframe configuration 2 is configured for the 15 carriers (for details, refer to Table 1 and Table 2), the uplink subframe may be a subframe 2, and all the downlink subframes, that is, the first downlink subframe set, associated with the uplink subframe include downlink subframes 4, 5, 6, and 8 on the 15 carriers.

Specifically, the first downlink subframe set may be configured by the access network device for the UE by using RRC signaling, or may be configured by the access network device for the UE in another manner. This is not specifically limited in this embodiment of the present application.

It should be noted that this embodiment of the present application is described by using an example in which the first downlink subframe set includes two subsets. However, the first downlink subframe set is not limited to two sets, and may include more than two sets. For example, if the access network device configures 15 carriers for the UE, downlink subframes corresponding to these carriers may be grouped into 3 subsets or 4 subsets. Certainly, the downlink subframes may be grouped into more sets. This is not specifically limited in this embodiment of the present application.

It should be noted that, in this embodiment of the present application, if A is a subset of B, A may include some elements of B, or may include all elements of B. For example, if the second subset is a subset of the first downlink subframe set, the second subset may include all downlink subframes in the first downlink subframe set, or may include only some downlink subframes in the first downlink subframe set. Moreover, in this embodiment of the present application, if A is a proper subset of B, A can include only some elements of B. For example, the first subset is a proper subset of the second subset, and the first subset includes some downlink subframes in the first downlink subframe set. Certainly, for a downlink subframe that does not belong to the second subset and that is in the first downlink subframe set, reference may be made to the method with respect to the first subset and the second subset in this embodiment of the present application. This is not specifically limited in this embodiment of the present application.

Specifically, the UE may determine the first subset and the second subset according to a pre-configuration. TDD CA is used as an example. It is assumed herein that subframes having a same subframe number on different carriers are different downlink subframes. The preconfigured first subset may include downlink subframes 4, 5, 6, and 8 on carriers 1 to 5, and the second subset may include downlink subframes 4, 5, 6, and 8 on carriers 1 to 10. It can be seen that the first subset is completely included in the second subset. As described above, in this embodiment of the present application, a third subset may be further included. The third subset specifically includes downlink subframes 4, 5, 6, and 8 on carriers 1 to 15. That is, the third subset includes all preconfigured downlink subframes that are configured by the access network device for the UE and that are associated with feedback information sent on an uplink subframe. The third subset is a universal set, that is, the first downlink subframe set. It can be seen that a relationship between the first subset and the second subset, a relationship between the second subset and the third subset, and a relationship between the first subset and the third subset all have similar structures. Therefore, the solution in this embodiment of the present application may be directly extended to the second subset and the third subset and to the first subset and the third subset. Certainly, another manner may be used in this embodiment of the present application. Details are not described herein.

Optionally, the UE may determine the first subset and the second subset by using a preconfigured rule. For example, the preconfigured rule may be determining the first subset and the second subset according to a carrier index, a subframe index, and a restriction on a bit quantity threshold (for example, 20 bits or 21 bits or 22 bits) of the feedback information. In this way, the UE determines that the first subset includes downlink subframes 4, 5, 6, and 8 on carriers 1 to 5, and that the second subset includes downlink subframes 4, 5, 6, and 8 on carriers 1 to 10. A selection method of the first subset is: All downlink subframes on the carrier 1 are first sequentially selected according to a time domain subframe index, and then downlink subframes on the carrier 2 are selected based on a frequency domain carrier index, until a quantity of downlink subframes that is defined by the threshold is reached. A selection manner of the second subset is similar to that of the first subset. For another example, assuming that the threshold is 10, an example in which there are five carriers and each carrier has the subframe configuration 2 is still used. One manner of grouping downlink subframes into sets is: The first subset includes downlink subframes 4, 5, 6, and 8 on the carriers 1 and 2 and downlink subframes 4 and 5 on the carrier 3, and the second subset includes, in addition to all downlink subframes in the first subset, downlink subframes 6 and 8 on the carrier 3 and downlink subframes 4, 5, 6, and 8 on the carriers 4 and 5. In this case, different subframes on one carrier may be grouped into different downlink subframe sets. It can be seen that, in the example, the first subset and the second subset are still selected first according to a time domain subframe number and then according to a frequency domain carrier number.

For another example, the preconfigured rule may be determining, according to a carrier index, a subframe index, and a restriction on a bit quantity threshold (for example, 20 bits or 21 bits or 22 bits) of the feedback information, downlink subframes whose bit quantities do not exceed the threshold and that are within a maximum carrier quantity, to form a set. In this rule, because different subframes on a same carrier can be grouped into multiple sets that are partially intersected with each other, a quantity of downlink subframes in a set may be less than the threshold. For example, the first subset includes downlink subframes 4, 5, 6, and 8 on carriers 1 and 2, and the second subset further includes, in addition to all downlink subframes in the first subset, downlink subframes 4, 5, 6, and 8 on carriers 3 to 5.

Certainly, the preconfigured rule may be selecting the first subset and the second subset first according to a frequency domain carrier index and then according to a time domain subframe index with reference to a bit quantity threshold of the feedback information. This is not specifically limited in this embodiment of the present application.

It can be seen that there may be multiple preconfigured rules, and any preconfigured rule that can implement the objective of this embodiment of the present application is applicable to this embodiment of the present application. Details are not described herein.

Optionally, the UE may determine the first subset and the second subset by using signaling from the access network device. The access network device may inform the UE of a grouping rule by using signaling, or may directly inform the UE of the first subset and the second subset. This is not specifically limited in this embodiment of the present application.

Certainly, the foregoing provides only several examples of implementations of determining, by the UE, the first subset and the second subset. Certainly, the UE may determine the first subset and the second subset in another manner. This is not specifically limited in this embodiment of the present application.

Specifically, in step S304 in this embodiment of the present application, the channel format with the codebook size p means that the channel format may at most support feedback of feedback information with the codebook size p, and the channel format with the codebook size q means that the channel format may at most support feedback of feedback information with the codebook size q. A codebook size is a quantity of original bits of feedback information before coding.

Specifically, the codebook size that is of feedback information and that corresponds to the first subset is a codebook size that is of feedback information and that is determined according to a quantity of downlink subframes included in the first subset. The codebook size that is of feedback information and that corresponds to the second subset is a codebook size that is of feedback information and that is determined according to a quantity of downlink subframes included in the second subset. For example, the downlink subframes included in the first subset are downlink subframes 4, 5, 6, and 8 on carriers 1 to 5, and there are 20 downlink subframes in total. If data scheduled in each subframe is one code word, the codebook size that is of feedback information and that corresponds to the first subset is 20 bits. If data scheduled in each subframe is two code words, the codebook size that is of feedback information and that corresponds to the first subset is 40 bits. Codebooks of feedback information may be sorted first according to carriers and then according to subframes, and the sorting is performed according to carrier indices and subframe indices in ascending order. Alternatively, codebooks of feedback information may be sorted first according to subframes and then according to carriers, and the sorting is performed according to carrier indices and subframe indices in ascending order. This is not specifically limited in this embodiment of the present application. For an unscheduled downlink subframe, a position needs to be reserved, and an NACK is padded. For the second subset, processing is similar, and details are not described below. The first subset, the second subset, and codebook sizes of feedback information that correspond to the first subset and the second subset have a correspondence shown in Table 3.

TABLE 3

| Subset | Codebook size of feedback information |
| --- | --- |
| First subset | P1 |
| Second subset | P2 |

Specifically, a relationship between a codebook size that is of feedback information and that corresponds to a subset and a codebook size of a channel is as follows: q≥q1, and p≥p1. That is, a codebook size (p) of a first uplink channel is not less than the codebook size (p1) that is of feedback information and that corresponds to the first subset, and a codebook size (q) of a second uplink channel is not less than the codebook size (q1) that is of feedback information and that corresponds to the second subset. In this way, it can be ensured that feedback information corresponding to the first subset may be sent on the first uplink channel resource, and feedback information corresponding to the second subset may be sent on the second uplink channel resource. Certainly, because q>p, the feedback information corresponding to the first subset may also be sent on the second uplink channel resource. This is not specifically limited in this embodiment of the present application.

Specifically, the first uplink channel resource may include n resource elements, and the second uplink channel resource may include m resource elements, where m≥n, and both m and n are positive integers. In this way, the channel format with the codebook size p may be considered as a channel format with n resource elements, and the channel format with the codebook size q may be considered as a channel format with m resource elements.

A resource element in the channel format with m resource elements and the channel format with n resource elements may include any one of a resource block (RB), a resource block pair (RBP), a sub RB, or a sub PRB. For example, if the resource element is an RB, there are m RBs and n RBs, where n may be 1, and m may be a positive integer greater than or equal to 1. A sub RB is a part of an RB. The sub RB may have a frequency domain width less than a frequency domain width of one RB, for example, occupy four subcarriers, and may occupy one timeslot or subframe in a time domain. Alternatively, the sub RB may have a time domain width less than one timeslot, for example, occupy three time domain symbols, and may occupy 12 subcarriers, that is, a frequency domain width of one RB, in a frequency domain. Alternatively, the sub RB occupies a time domain length less than that of a current RB in a time domain, and occupies a frequency domain width less than that of the current RB in a frequency domain. A sub PRB is a pair of sub RBs.

It should be noted that this embodiment of the present application is applicable to a case in which m=n. For example, in a possible implementation, the channel format with the codebook size p and the channel format with the codebook size q occupy a same quantity of resource elements, and a length of an orthogonal code used by the channel format with the codebook size p is greater than a length of an orthogonal code used by the channel format with the codebook size q.

It should be noted that, when m=n, that is, when time-frequency resources occupied by the two channel formats have a same quantity of resource elements, for example, both the channel formats occupy one RB, or when time-frequency resources occupied by the two channel formats completely overlap each other, a codebook size of feedback information that can be transmitted in the channel format with the codebook size q (or the channel format with m resource elements) is greater than a codebook size of feedback information that can be transmitted in the channel format with the codebook size p (or the channel format with n resource elements) because the length of the orthogonal code used by the channel format with the codebook size q is less than the length of the orthogonal code used by the channel format with the codebook size p. This increases a codebook size by decreasing multiplexing efficiency of a same time-frequency resource. For example, a PUCCH format 3 is used as an example. It is assumed that the two formats each occupy a time-frequency resource in a PUCCH format 3 over one RB, but a length of a time domain orthogonal code in the channel format with the codebook size p is 5. That is, the channel format with the codebook size p of at most 5 UEs can be multiplexed in the RB. However, it is assumed that lengths of time domain orthogonal codes in the channel format with the codebook size q are 2 and 3. That is, the first two time domain symbols are spread by using a time domain orthogonal code with a length of 2, and the last three time domain symbols are spread by using a time domain orthogonal code with a length of 3. It is assumed that other two time domain symbols in the timeslot are used to transmit an RS. In this case, the RB may accommodate the channel format with the codebook size q for 2 UEs, but the codebook size of the feedback information supported by the channel format with the codebook size q is twice the codebook size of the feedback information supported by the channel format with the codebook size p because the channel format with the codebook size q is spread by using two time domain orthogonal codes. A code length of each time domain orthogonal code is less than that of the time domain orthogonal code with the length of 5 used in the channel format with the codebook size p, but a multiplexing capability is determined by a length of a time domain orthogonal code of the two time domain orthogonal codes that has a shorter length.

Specifically, in step S304 in this embodiment of the present application, when sending of the r pieces of CSI is configured in the uplink subframe for the UE, the codebook size of the feedback information corresponds to the first subset, and the channel resource determined by the UE is the second uplink channel resource, the UE needs to send only the feedback information on the second uplink channel resource according to the codebook size that is of feedback information and that corresponds to the first subset. Therefore, considering that the codebook size that is of feedback information and that corresponds to the first subset is not greater than a codebook size of a first uplink channel, and the codebook size of the first uplink channel is less than a codebook size of a second uplink channel, a maximum quantity of bits of feedback information that can be carried on the second uplink channel resource is not restricted, and the UE not only can send the feedback information on the second uplink channel resource, but also can send the t pieces of CSI of the r pieces of CSI on the second uplink channel resource, where r≥2 and 2≤t≤r. That is, the UE sends the feedback information and the t pieces of CSI of the r pieces of CSI on the second uplink channel resource, where r≥2 and 2≤t≤r, so that multiple pieces of CSI are simultaneously transmitted.

For example, it is assumed that the codebook size of the second uplink channel is 40 bits and the codebook size of the feedback information is 20 bits, in addition to the feedback information of 20 bits, the CSI may be further carried on the second uplink channel. Assuming that r=2 and each piece of CSI has 10 bits, the UE may send all of the r pieces of CSI to the access network device. That is, the UE sends the feedback information and the t pieces of CSI of the r pieces of CSI on the second uplink channel resource, where r=t=2.

Certainly, the UE may send only some of the r pieces of CSI to the access network device, that is, r>t. For example, if r=3 pieces of CSI is configured in the uplink subframe, but in this case, in addition to the feedback information, only t=2 pieces of CSI can be further carried in the channel format with the codebook size q, the t pieces of CSI of the r pieces of CSI may be sent to the access network device.

It should be noted that, for that sending of the r pieces of CSI is configured in the uplink subframe for the UE, sending of one piece of CSI may mean sending of a type of CSI on a carrier, for example, sending of wideband channel quality information (Channel Quality Information, CQI for short) on a carrier 1, or sending of a rank indicator (Rank Indicator, RI for short) on a carrier 2, or sending of sub-band CQI on a carrier 3, or sending of a precoding matrix indicator (Precoding Matrix Indicator, PMI for short) on a carrier 4. This is not specifically limited in this embodiment of the present application.

Figure 4:
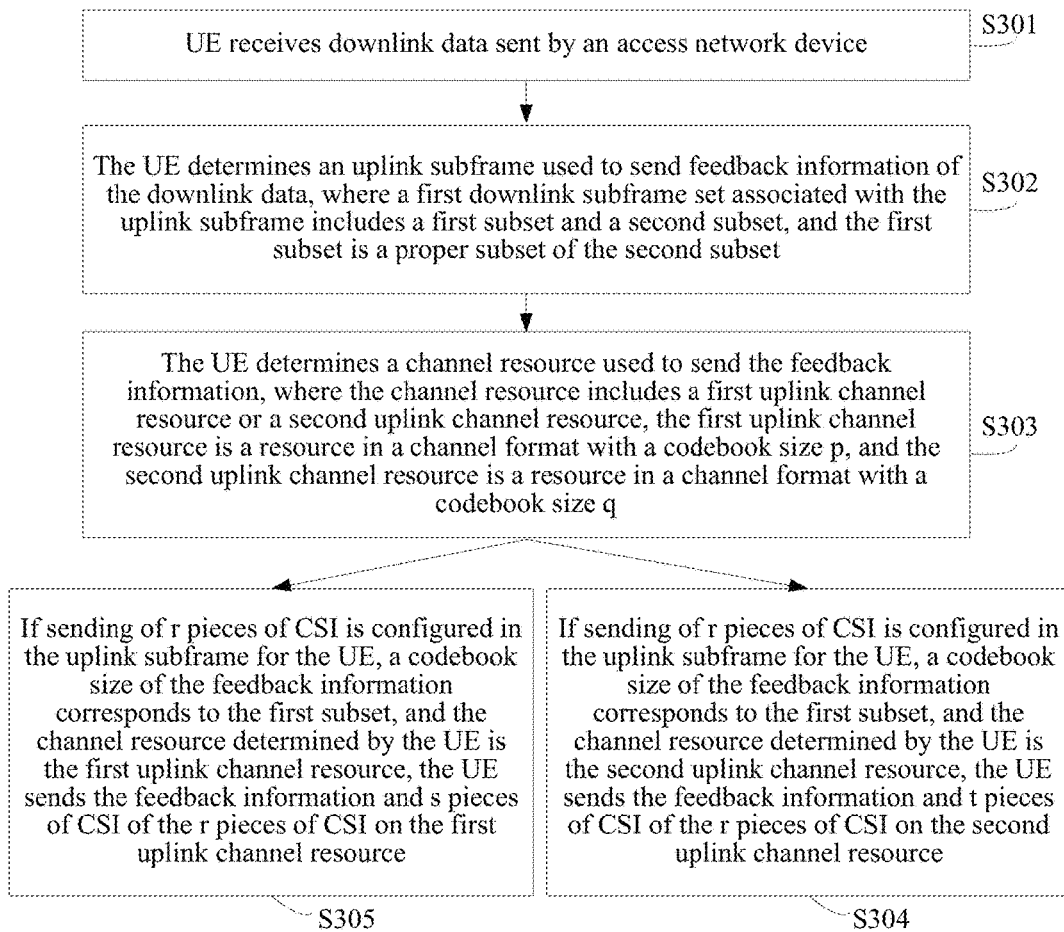
FIG. 4 is a schematic flowchart 2 of a CSI transmission method according to an embodiment of the present application.

Further, as shown in FIG. 4, after step S303, the CSI transmission method provided in this embodiment of the present application may further include the following steps.

S305. If sending of r pieces of CSI is configured in the uplink subframe for the UE, a codebook size of the feedback information corresponds to the first subset, and the channel resource determined by the UE is the first uplink channel resource, the UE sends the feedback information and s pieces of CSI of the r pieces of CSI on the first uplink channel resource, where 0≤s≤r, and s is a positive integer.

Specifically, in step S305 in this embodiment of the present application, when sending of the r pieces of CSI is configured in the uplink subframe for the UE, the codebook size of the feedback information corresponds to the first subset, and the channel resource determined by the UE is the first uplink channel resource, the UE sends the feedback information on the first uplink channel resource according to the codebook size that is of feedback information and that corresponds to the first subset. Therefore, considering that the codebook size that is of feedback information and that corresponds to the first subset is not greater than a codebook size of a first uplink channel, a maximum quantity of bits of feedback information that can be carried on the first uplink channel resource is restricted, and the UE may send one or more pieces of CSI on the first uplink channel resource, or cannot send even one piece of CSI on the first uplink channel resource. That is, the UE may send the feedback information on the first uplink channel resource, and may further send the s pieces of CSI of the r pieces of CSI on the first uplink channel resource, where 0≤s≤r, and s is a positive integer.

For example, assuming that the codebook size of the first uplink channel is 20 bits and the codebook size of the feedback information is 20 bits, after the feedback information of 20 bits is carried on the first uplink channel, no CSI can be carried on the first uplink channel. If it is assumed that the codebook size of the first uplink channel is 20 bits and the codebook size of the feedback information is 10 bits, after the feedback information of 10 bits is carried on the first uplink channel, CSI may further be carried on the first uplink channel. Assuming that r=2 and each piece of CSI has 10 bits, the UE may send the feedback information and the t pieces of CSI of the r pieces of CSI on the first uplink channel resource, where t=1.

As described above, the UE may send only some of the r pieces of CSI to the access network device, or may send all of the r pieces of CSI to the access network device. This is not specifically limited in this embodiment of the present application.

Figure 5:
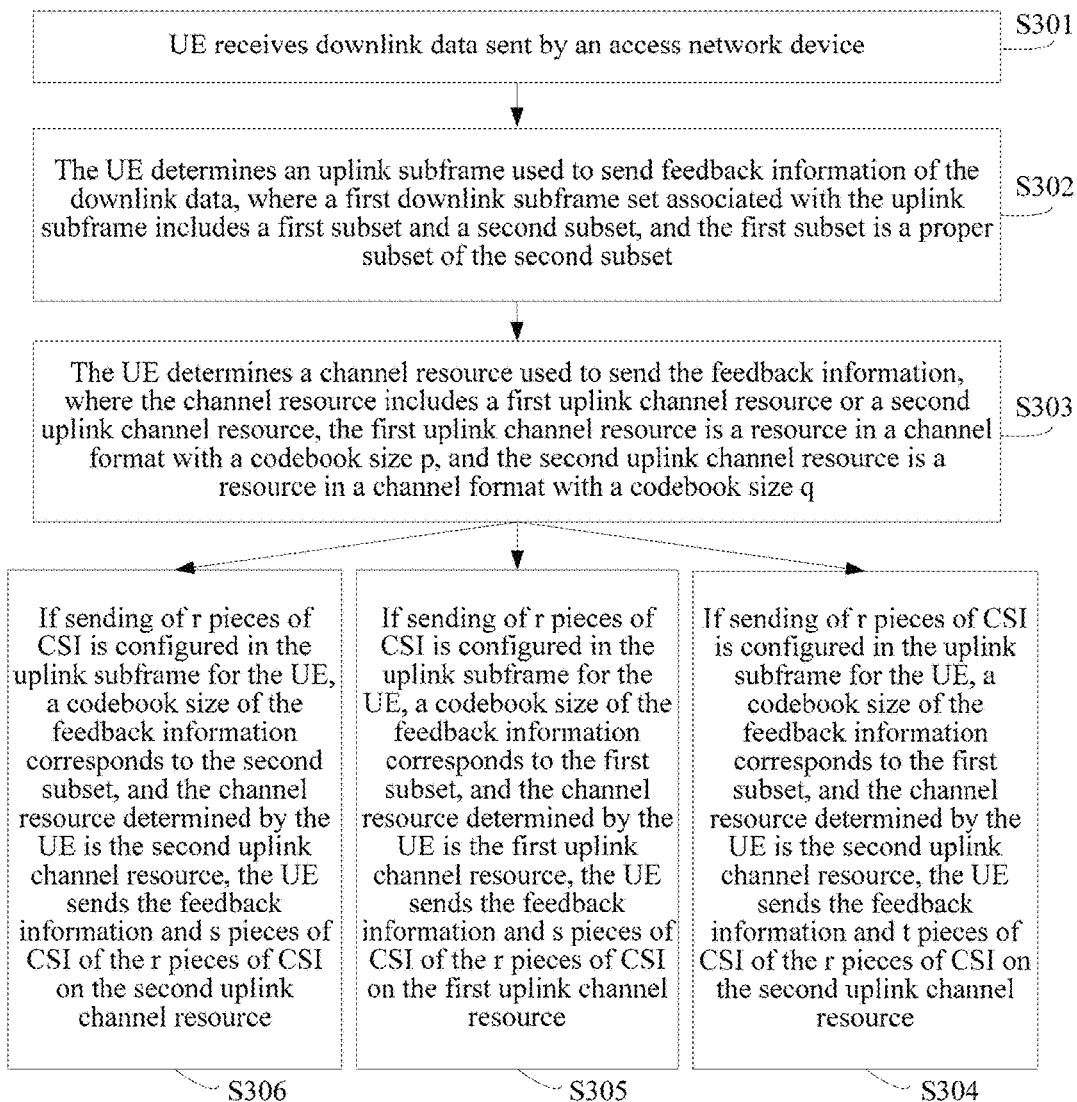
FIG. 5 is a schematic flowchart 3 of a CSI transmission method according to an embodiment of the present application.

Further, as shown in FIG. 5, after step S303, the CSI transmission method provided in this embodiment of the present application may further include the following step.

S306: If sending of r pieces of CSI is configured in the uplink subframe for the UE, a codebook size of the feedback information corresponds to the second subset, and the channel resource determined by the UE is the second uplink channel resource, the UE sends the feedback information and s pieces of CSI of the r pieces of CSI on the second uplink channel resource, where 0≤s≤r, and q1 and s are positive integers.

Specifically, in step S306 in this embodiment of the present application, if sending of the r pieces of CSI is configured in the uplink subframe for the UE, the codebook size of the feedback information corresponds to the second subset, and the channel resource determined by the UE is the second uplink channel resource, the UE sends the feedback information on the second uplink channel resource according to the codebook size that is of feedback information and that corresponds to the second subset. Therefore, considering that the codebook size that is of feedback information and that corresponds to the second subset is not greater than a codebook size of a second uplink channel, a maximum quantity of bits of feedback information that can be carried on the second uplink channel resource is restricted, and the UE may send one or more pieces of CSI on the second uplink channel resource, or cannot send even one piece of CSI on the second uplink channel resource. That is, the UE may send the feedback information on the second uplink channel resource, and may further send the s pieces of CSI of the r pieces of CSI on the second uplink channel resource, where 0≤s≤r, and s is a positive integer.

For example, assuming that the codebook size of the second uplink channel is 40 bits and the codebook size of the feedback information is 40 bits, after the feedback information of 40 bits is carried on the second uplink channel, no CSI can be carried on the second uplink channel. If it is assumed that the codebook size of the second uplink channel is 40 bits and the codebook size of the feedback information is 20 bits, after the feedback information of 10 bits is carried on the second uplink channel, CSI may further be carried on the second uplink channel. Assuming that r=2 and each piece of CSI has 10 bits, the UE may send all of the r pieces of CSI to the access network device. That is, the UE sends the feedback information and the s pieces of CSI of the r pieces of CSI on the second uplink channel resource, where r=s=2.

Certainly, as described above, the UE may send only some of the r pieces of CSI to the access network device, that is, r>s. For example, if r=3 pieces of CSI is configured in the uplink subframe, but in this case, in addition to the feedback information, only s=2 pieces of CSI can be further carried in the channel format with the codebook size q, the s pieces of CSI of the r pieces of CSI may be sent to the access network device.

It should be noted that, in this embodiment of the present application, to support CA of more carriers, a method is extending a capacity of a current PUCCH format 3, for example, extending the capacity of the current PUCCH format 3 from one RB to multiple RBs. Specifically, a PUCCH format 3 over two RBs is used as an example. Only 12 subcarriers occupied by each timeslot need to be extended to 24 subcarriers without changing a time domain OCC spread spectrum. In this way, the dual-RB PUCCH format 3 may be proportionally enabled to support transmission of feedback information of 40 bits, and CA of more carriers (for example, 10 carriers) may be supported. A solution of extension to three or more RBs is similar, and extension needs to be performed in only the frequency domain. However, due to a restricted multiplexing capability of a single-RB PUCCH format 3, overheads of the single-RB PUCCH format 3 are higher than those of a PUCCH format 1a/1b. For extension to a multi-RB PUCCH format 3, overheads are higher, because a multiplexing capability of the multi-RB PUCCH format 3 is the same as that of the single-RB PUCCH format 3, but occupied resources are multiplied with extension of an RB. In addition, in addition to the extension of the RB, another manner may be used. For example, a resource element smaller than a granularity of the RB may be used to introduce a large-capacity PUCCH, or even a spreading code may be canceled and time/frequency division PUCCH multiplexing may be directly used. This is not specifically limited in this embodiment of the present application.

The dual-RB PUCCH format 3 is used as an example. It is assumed that CA of 10 carriers is supported. That is, if 10 carriers are scheduled, the dual-RB PUCCH format 3 is used. However, after 10 carriers are configured for the UE, specifically, factors in multiple aspects need to be considered to determine, from the 10 carriers, a quantity of carriers to be selected for the UE for data scheduling. All the 10 carriers are not scheduled in each subframe. Specifically, a quantity of scheduled carriers is determined according to current service load. Even if there is a scheduling requirement, a capacity of a PDCCH resource region further needs to be considered. If a PDCCH of the UE cannot be scheduled, data on a carrier corresponding to the PDCCH cannot be scheduled either. That is, even if 10 carriers are configured, in a subframe, data on only some carriers needs to be scheduled for transmission. In this way, a manner of dynamic PUCCH format fallback may be introduced. For example, if data on only the first five carriers is scheduled, dynamic fallback may be performed to switch to the single-RB PUCCH format 3 to transmit the feedback information. If the 10 carriers are scheduled, the dual-RB PUCCH format 3 may be used to transmit the feedback information, thereby reducing overheads of the PUCCH format 3.

Further, in the CSI transmission method provided in this embodiment of the present application, the receiving, by the UE, downlink data from an access network device (step S301) may specifically include:

receiving, by the UE, the downlink data in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

Specifically, the second downlink subframe set may be a scheduling set, or an active set. If the second downlink subframe is a scheduling set, the second downlink subframe set may be specifically obtained in the following manner:

before receiving the downlink data, receiving, by the UE, downlink control information that is from the access network device to schedule the downlink data, so as to determine, according to the downlink control information, which downlink subframes are scheduled, where the scheduled downlink subframes form the second downlink subframe set, and the second downlink subframe set is a subset of the first downlink subframe set.

There may be one or more scheduled downlink subframes. When there is one scheduled downlink subframe, the scheduled downlink subframe may be a downlink subframe on a secondary carrier, or may be a downlink subframe that is on a primary carrier and that is scheduled by a control channel whose DAI field value is greater than 1, but is not a downlink subframe for a PDSCH scheduled on the primary carrier and that corresponds to a PDCCH whose DAI field indicates 1.

If the second downlink subframe is an active set, it may be understood that a downlink subframe actually scheduled for the UE is a downlink subframe in a subset of the second downlink subframe set. The active second downlink subframe set may be configured by the access network device for the UE by means of Media Access Control (Media Access Control, MAC for short) signaling, or may be configured by the access network device for the UE in another manner. This is not specifically limited in this embodiment of the present application.

It should be noted that, although this embodiment of the present application is described on an assumption that the second downlink subframe set is an actually scheduled downlink subframe set, this embodiment of the present application is also applicable to a case in which the second downlink subframe set is the active downlink subframe set. This is not specifically limited in this embodiment of the present application.

It should be noted that, in this embodiment of the present application, it is assumed that 15 carriers are configured for the UE, and feedback information of at most 60 bits needs to be fed back on the uplink subframe 2. However, a quantity of carriers or downlink subframes scheduled for the UE in a subframe may be less than the foregoing maximum value, and is specifically related to multiple factors such as transient service load of the UE and a capacity of a control channel.

Further, if sending of the r pieces of CSI is configured in the uplink subframe for the UE, and the second downlink subframe set is a subset of the first subset, the channel resource determined by the UE is the first uplink channel resource or the second uplink channel resource; or if sending of the r pieces of CSI is configured in the uplink subframe for the UE, the second downlink subframe set includes a downlink subframe in the first subset and a downlink subframe that belongs to the second subset but does not belong to the first subset, and the second downlink subframe set is a subset of the second subset, the channel resource determined by the UE is the second uplink channel resource.

For example, it is assumed that the first subset includes downlink subframes 4, 5, 6, and 8 on carriers 1 to 5, and the second downlink subframe set includes subframes 4, 5, 6, and 8 on the carrier 1, subframes 4, 5, and 6 on the carrier 2, and subframes 4 and 5 on the carrier 3, where the carrier 1 is a primary carrier. Therefore, the second downlink subframe set is a subset of the first subset. In this case, the channel resource determined by the UE may be the first uplink channel resource, or may be the second uplink channel resource.

For example, it is assumed that the first subset includes downlink subframes 4, 5, 6, and 8 on carriers 1 to 5, and the second subset includes downlink subframes 4, 5, 6, and 8 on carriers 1 to 10. The second downlink subframe set includes subframes 4, 5, 6, and 8 on the carrier 1, subframes 4, 5, and 6 on the carrier 3, and subframes 4 and 5 on the carrier 6. That is, the second downlink subframe set includes a downlink subframe in the first subset and a downlink subframe that belongs to the second subset but does not belong to the first subset, and the second downlink subframe set is a subset of the second subset. In this case, the channel resource determined by the UE is the second uplink channel resource.

Further, before the determining, by the UE, a channel resource used to send the feedback information (step S303), the method may further include:

receiving, by the UE, resource indication information from the access network device, where the resource indication information is used to indicate the channel resource for sending the feedback information.

The determining, by the UE, a channel resource used to send the feedback information includes:

determining, by the UE according to the resource indication information and a mapping relationship that is between different states in a state set in the resource indication information and different channel resources in a channel resource set and that is preconfigured by the access network device for the UE, the channel resource used to send the feedback information, where the channel resource set includes the first uplink channel resource and the second uplink channel resource.

Specifically, the resource indication information may be included in the downlink control information for scheduling the downlink data, and a DAI in the downlink control information including the resource indication information is not 1. For example, the DAI is greater than 1. Alternatively, for an FDD CA system, the resource indication information is not included in downlink control information for scheduling a primary carrier, but is included in only downlink control information for scheduling a secondary carrier.

The resource indication information may be an explicit bit in the downlink control information. For example, the resource indication information is carried in at least one bit on a control channel, and different PUCCH channel resources are used for different state flags of the at least one bit. Optionally, an implicit indication manner may be used for the resource indication information. For example, different scrambling codes on a control channel indicate different channel resources. Specifically, the resource indication information may be an ACK/NACK resource indicator (ACK/NACK resource indicator, ARI for short).

For example, the mapping relationship that is between different states in a state set in the resource indication information and different channel resources in a channel resource set and that is preconfigured by the access network device for the UE may be shown in Table 4:

TABLE 4

| | State of resource indication information | | | |
|---|---|---|---|---|
| | 00 | 01 | 10 | 11 |
| Channel resource | Channel resource | Channel resource | Channel resource | Channel resource |

TABLE 4-continued

| State of resource indication information | | | |
|---|---|---|---|
| 00 | 01 | 10 | 11 |
| 1 in a single-RB PUCCH format 3 | 2 in a single-RB PUCCH format 3 | 1 in a dual-RB PUCCH format 3 | 2 in a dual-RB PUCCH format 3 |

The mapping relationship may be configured by the access network device for the UE by using RRC dedicated signaling, or may be configured by the access network device for the UE in another manner. This is not specifically limited in this embodiment of the present application.

It should be noted that Table 4 is only a specific example of the mapping relationship configured by the access network device for the UE. Certainly, the access network device may configure another mapping relationship for the UE. This is not specifically limited in this embodiment of the present application.

Specifically, after receiving the resource indication information from the access network device, the UE may determine, according to the resource indication information and the mapping relationship, the channel resource used to send the feedback information.

For example, in this case, even if the second downlink subframe set includes only the downlink subframe in the first subset, if a state of the resource indication information received by the UE is 10, according to Table 4, it indicates sending the feedback information on a dual-RB PUCCH channel resource 1. Therefore, the UE determines to use a dual-RB PUCCH format to send the feedback information on the channel resource 1 in the dual-RB PUCCH format 3. In this case, the UE also finds that the UE misses, in detection, a PDCCH that schedules a downlink subframe outside the first subset. When no PDCCH is missed in detection, considering that the second downlink subframe set includes only the downlink subframe in the first subset, a base station instructs the UE to use a single-RB PUCCH channel resource. In contrast, if the single-RB PUCCH format 3 is used as long as the UE finds that the second downlink subframe set is a subset of the first subset, once a control channel is missed in detection, a base station expects the UE to transmit the feedback information by using the dual RB-PUCCH format 3, but the UE actually transmits the feedback information by using the single-RB PUCCH format 3. Therefore, a problem of an inconsistency occurs between the UE and the base station, and consequently, the base station fails to decode the feedback information. If the base station considers that a channel resource is not allocated to the UE and allocates the channel resource to another UE, but the channel resource that is already allocated to the another UE and that is in the single-RB PUCCH format 3 is used by the current UE to send the feedback information, interference is caused to a PUCCH format 3 of the another UE. Therefore, in this embodiment, the resource indication information is used to indicate whether to use the single-RB PUCCH format 3 or the dual-RB-PUCCH format 3. Therefore, provided that the UE determines that the resource indication information indicates use of the dual-RB PUCCH format 3, the UE sends the feedback information by using the dual-RB PUCCH format 3, thereby resolving a problem that a PUCCH channel resource is indeterminate because a control channel is missed in detection.

Further, in this embodiment of the present application, the resource indication information is further used to indicate the codebook size of the feedback information, and the method further includes:

determining, by the UE, the codebook size of the feedback information according to the resource indication information and a mapping relationship that is between the different states in the state set in the resource indication information and different codebook sizes in a codebook size set and that is preconfigured by the access network device for the UE, where the codebook size set includes the codebook size corresponding to the first subset and the codebook size corresponding to the second subset.

That is, in this embodiment of the present application, the resource indication information is used to not only indicate the channel resource used to send the feedback information, but also indicate the codebook size of the feedback information (including the codebook size p1 corresponding to the first subset or the codebook size q1 corresponding to the second subset).

For example, the mapping relationship that is between the different states in the state set in the resource indication information and different codebook sizes in the codebook size set and that is preconfigured by the access network device for the UE may be shown in Table 5:

TABLE 5

| | State of resource indication information | | | |
|---|---|---|---|---|
| | 00 | 01 | 10 | 11 |
| Codebook size | Codebook size p1 corresponding to a first subset | Codebook size p1 corresponding to a first subset | Codebook size p1 corresponding to a first subset | Codebook size q1 corresponding to a second subset |

It should be noted that Table 5 is only a specific example of the mapping relationship configured by the access network device for the UE. Certainly, the access network device may configure another mapping relationship for the UE. This is not specifically limited in this embodiment of the present application.

Specifically, after receiving the resource indication information from the access network device, the UE may determine the codebook size of the feedback information according to the resource indication information and the mapping relationship shown in Table 5. Details are not described herein in this embodiment of the present application.

Optionally, the resource indication information is further used to indicate a subset corresponding to the codebook size of the feedback information, and the method further includes:

determining, by the UE according to the resource indication information and a mapping relationship that is between the different states in the state set in the resource indication information and subsets corresponding to different codebook sizes in a subset set corresponding to a codebook size and that is preconfigured by the access network device for the UE, the subset corresponding to the codebook size of the feedback information, where the subset set corresponding to the codebook size includes the first subset and the second subset.

That is, in this embodiment of the present application, the resource indication information is used to not only indicate the channel resource used to send the feedback information, but also indicate the subset (including the first subset or the second subset) corresponding to the codebook size of the feedback information.

For example, the mapping relationship that is between the different states in the state set in the resource indication information and subsets corresponding to different codebook sizes in a subset set corresponding to a codebook size and that is preconfigured by the access network device for the UE may be shown in Table 6:

TABLE 6

| | State of resource indication information | | | |
|---|---|---|---|---|
| | 00 | 01 | 10 | 11 |
| Subset corresponding to a codebook size | First subset | First subset | First subset | First subset |

It should be noted that Table 6 is only a specific example of the mapping relationship configured by the access network device for the UE. Certainly, the access network device may configure another mapping relationship for the UE. This is not specifically limited in this embodiment of the present application.

Specifically, after receiving the resource indication information from the access network device, the UE may determine, according to the resource indication information and the mapping relationship shown in Table 6, the subset corresponding to the codebook size of the feedback information. Details are not described herein in this embodiment of the present application.

It should be noted that the mapping relationship shown in Table 4 and the mapping relationship shown in Table 5 or Table 6 may be separately configured by the access network device for the UE, or may be simultaneously configured by the access network device for the UE. For example, the state 10 is used to indicate use of the second uplink channel resource and the codebook size p1, but the state 11 indicates use of the second uplink channel resource and the codebook size q1. This is not specifically limited in this embodiment of the present application.

Further, after the determining, by the UE, a channel resource used to send the feedback information, the method further includes:

if CSI sending is not configured in the uplink subframe for the UE, the codebook size of the feedback information corresponds to the first subset, and the channel resource determined by the UE is the first uplink channel resource, sending, by the UE, the feedback information on the first uplink channel resource; or if CSI sending is not configured in the uplink subframe for the UE, the codebook size of the feedback information corresponds to the second subset, and the channel resource determined by the UE is the second uplink channel resource, sending, by the UE, the feedback information on the second uplink channel resource.

Specifically, if CSI sending is not configured in the uplink subframe for the UE, an indication method of current channel resource indication information is different from the indication method in the scenario in which CSI sending is configured. The current channel resource indication information may be used to indicate only the channel resource for sending the feedback information, and does not need to be used to indicate the codebook size of the feedback information or the subset corresponding to the codebook size of the feedback information. If the channel resource that is determined by the UE according to the channel resource indication information is the second uplink channel resource, the UE may directly transmit the feedback information on the second uplink channel resource according to the codebook size q1. In contrast, if the channel resource determined by the UE according to the channel resource indication information is the first uplink channel resource, the UE may directly transmit the feedback information on the first uplink channel resource according to the codebook size q1.

Further, if CSI sending is not configured in the uplink subframe for the UE, and the second downlink subframe set is the subset of the first subset, the channel resource determined by the UE is the first uplink channel resource; or if CSI sending is not configured in the uplink subframe for the UE, the second downlink subframe set includes the downlink subframe in the first subset and the downlink subframe that belongs to the second subset but does not belong to the first subset, and the second downlink subframe set is the subset of the second subset, the channel resource determined by the UE is the second uplink channel resource.

For example, it is assumed that the first subset includes downlink subframes 4, 5, 6, and 8 on carriers 1 to 5, and the second downlink subframe set includes subframes 4, 5, 6, and 8 on the carrier 1, subframes 4, 5, and 6 on the carrier 2, and subframes 4 and 5 on the carrier 3, where the carrier 1 is a primary carrier. Therefore, the second downlink subframe set is a subset of the first subset. In this case, because CSI sending is not configured in the uplink subframe for the UE, that is, the UE needs to send only the feedback information, the channel resource determined by the UE is the first uplink channel resource.

For example, it is assumed that the first subset includes downlink subframes 4, 5, 6, and 8 on carriers 1 to 5, and the second subset includes downlink subframes 4, 5, 6, and 8 on carriers 1 to 10. The second downlink subframe set includes subframes 4, 5, 6, and 8 on the carrier 1, subframes 4, 5, and 6 on the carrier 3, and subframes 4 and 5 on the carrier 6. That is, the second downlink subframe set includes a downlink subframe in the first subset and a downlink subframe that belongs to the second subset but does not belong to the first subset, and the second downlink subframe set is a subset of the second subset. In this case, the channel resource determined by the UE is the second uplink channel resource.

Specifically, in this embodiment of the present application, because CSI sending is not configured in the uplink subframe for the UE, the UE sends the feedback information on the first uplink channel resource according to the codebook size corresponding to the first subset, or the UE sends the feedback information on the second uplink channel resource according to the codebook size corresponding to the second subset. By introducing the manner of dynamic PUCCH format fallback, overheads of the PUCCH format 3 are reduced.

Embodiment 2

Figure 6:
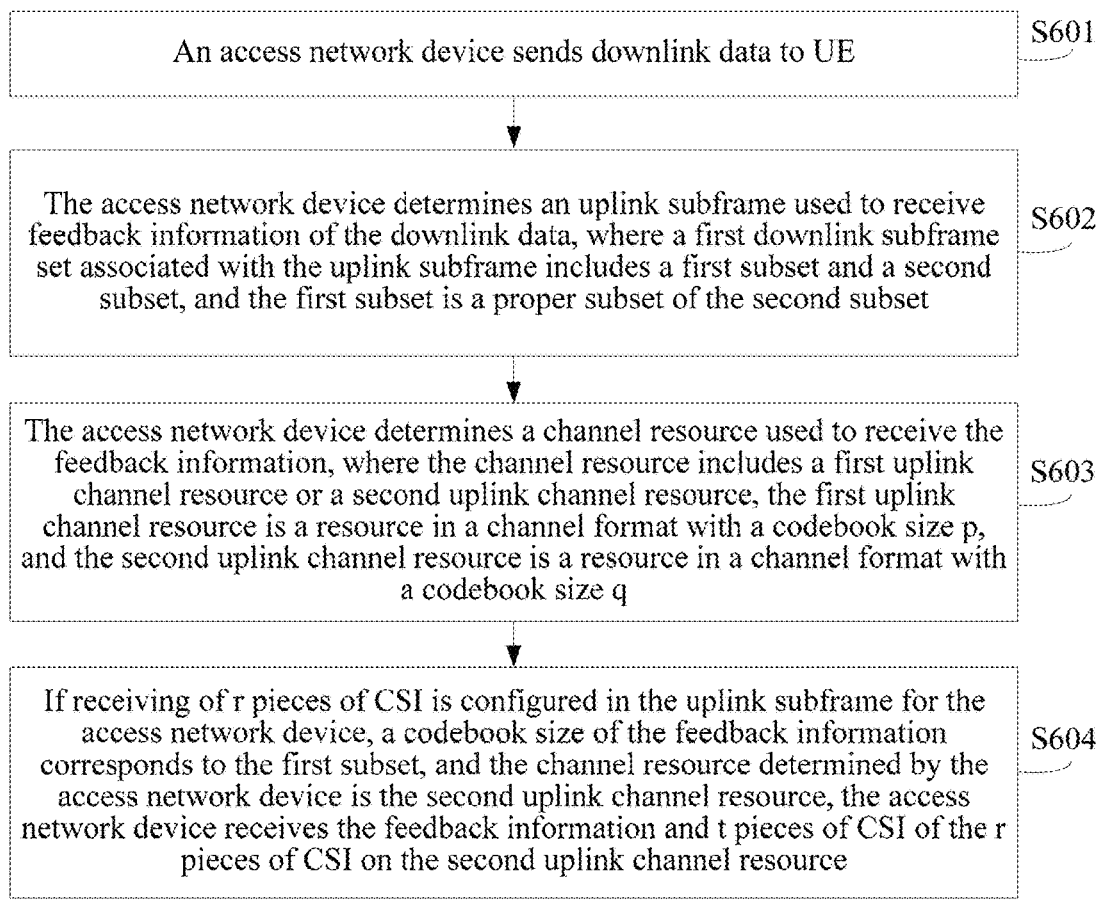
FIG. 6 is a schematic flowchart 4 of a CSI transmission method according to an embodiment of the present application.

This embodiment of the present application provides a CSI transmission method that is specifically applied to an access network device. As shown in FIG. 6, the method includes the following steps.

S601. The access network device sends downlink data to UE.

S602. The access network device determines an uplink subframe used to receive feedback information of the downlink data. A first downlink subframe set associated with the uplink subframe includes a first subset and a second subset, and the first subset is a proper subset of the second subset.

Specifically, for a related description of the feedback information in this embodiment of the present application, refer to Embodiment 1. Details are not described herein again.

Specifically, the access network device may determine, according to a pre-configuration, the uplink subframe used to receive the feedback information. For example, the uplink subframe used to receive the feedback information may be determined by using a preconfigured time sequence or timing correspondence between a downlink subframe and an uplink subframe, that is, the uplink subframe used to receive the feedback information may be determined according to a preconfigured uplink-downlink subframe configuration. For example, the uplink subframe for receiving the feedback information may be determined according to Table 2.

For a related description of the first downlink subframe set associated with the uplink subframe, refer to Embodiment 1. Details are not described herein again.

Specifically, for a manner of determining, by the access network device, the first subset and the second subset, refer to a manner of determining, by the UE, the first subset and the second subset in Embodiment 1. Details are not described herein again.

S603. The access network device determines a channel resource used to receive the feedback information. The channel resource includes a first uplink channel resource or a second uplink channel resource, the first uplink channel resource is a resource in a channel format with a codebook size p, and the second uplink channel resource is a resource in a channel format with a codebook size q, where q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers.

Specifically, for a related description of the channel format with the codebook size p and the channel format with the codebook size q, and a related description of the codebook size that is of feedback information and that corresponds to the first/second subset, refer to Embodiment 1. Details are not described herein again.

Specifically, the first uplink channel resource may include n resource elements, and the second uplink channel resource may include m resource elements, where m≤n, and both m and n are positive integers. In this way, the channel format with the codebook size p may be considered as a channel format with n resource elements, and the channel format with the codebook size q may be considered as a channel format with m resource elements. For a related detailed description, refer to Embodiment 1. Details are not described herein again.

S604. If receiving of r pieces of CSI is configured in the uplink subframe for the access network device, a codebook size of the feedback information corresponds to the first subset, and the channel resource determined by the access network device is the second uplink channel resource, the access network device receives the feedback information and t pieces of CSI of the r pieces of CSI on the second uplink channel resource, where r≥2, 2≤t≤r, and p1, r, and t are all positive integers.

Specifically, when sending of the r pieces of CSI is configured in the uplink subframe for the UE, the codebook size of the feedback information corresponds to the first subset, and the channel resource determined by the UE is the second uplink channel resource, the access network device needs to receive only the feedback information on the second uplink channel resource according to the codebook size that is of feedback information and that corresponds to the first subset. Therefore, considering that the codebook size that is of feedback information and that corresponds to the first subset is not greater than a codebook size of a first uplink channel, and the codebook size of the first uplink channel is less than a codebook size of a second uplink channel, a maximum quantity of bits of feedback information that can be carried on the second uplink channel resource is not restricted, and the access network device not only can receive the feedback information on the second uplink channel resource, but also can receive the t pieces of CSI of the r pieces of CSI on the second uplink channel resource, where r≥2 and 2≤t≤r. That is, the access network device receives the feedback information and the t pieces of CSI of the r pieces of CSI on the second uplink channel resource, where r≥2 and 2≤t≤r, so that multiple pieces of CSI are simultaneously transmitted.

For example, it is assumed that the codebook size of the second uplink channel is 40 bits and the codebook size of the feedback information is 20 bits, in addition to the feedback information of 20 bits, the CSI may be further carried on the second uplink channel. Assuming that r=2 and each piece of CSI has 10 bits, the access network device may receive all of the r pieces of CSI. That is, the UE sends the feedback information and the t pieces of CSI of the r pieces of CSI on the second uplink channel resource, where r=t=2.

Certainly, the access network device may receive only some of the r pieces of CSI, that is, r>t. For example, if r=3 pieces of CSI is configured in the uplink subframe, but in this case, in addition to the feedback information, only t=2 pieces of CSI can be further carried in the channel format with the codebook size q, the access network device may receive the t pieces of CSI of the r pieces of CSI.

It should be noted that, for that receiving of the r pieces of CSI is configured in the uplink subframe for the access network device, receiving of one piece of CSI may mean receiving of a type of CSI on a carrier, for example, receiving of CQI on a carrier 1, or receiving of an RI on a carrier 2, or receiving of sub-band CQI on a carrier 3, or receiving of a PMI on a carrier 4. This is not specifically limited in this embodiment of the present application.

Figure 7:
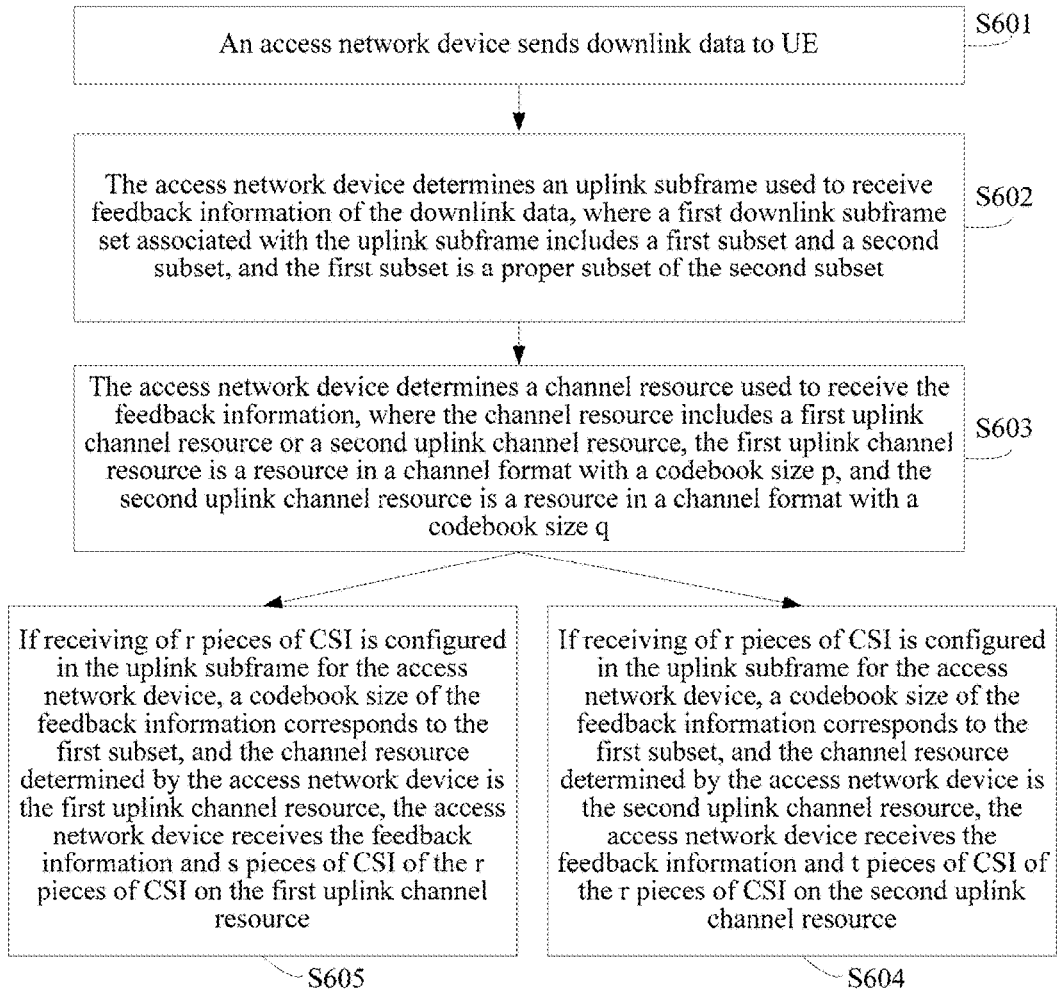
FIG. 7 is a schematic flowchart 5 of a CSI transmission method according to an embodiment of the present application.

Further, as shown in FIG. 7, after step S603, the CSI transmission method provided in this embodiment of the present application may further include the following step.

S605. If receiving of r pieces of CSI is configured in the uplink subframe for the access network device, a codebook size of the feedback information corresponds to the first subset, and the channel resource determined by the access network device is the first uplink channel resource, the access network device receives the feedback information and s pieces of CSI of the r pieces of CSI on the first uplink channel resource, where 0≤s≤r, and s is a positive integer.

Specifically, when receiving of the r pieces of CSI is configured in the uplink subframe for the access network device, the codebook size of the feedback information corresponds to the first subset, and the channel resource determined by the access network device is the first uplink channel resource, the access network device receives the feedback information on the first uplink channel resource according to the codebook size that is of feedback information and that corresponds to the first subset. Therefore, considering that the codebook size that is of feedback information and that corresponds to the first subset is not greater than a codebook size of a first uplink channel, a maximum quantity of bits of feedback information that can be carried on the first uplink channel resource is restricted, and the access network device may receive one or more pieces of CSI on the first uplink channel resource, or cannot receive even one piece of CSI on the first uplink channel resource. That is, the access network device may receive the feedback information on the first uplink channel resource, and may further receive the s pieces of CSI of the r pieces of CSI on the first uplink channel resource, where 0≤s≤r, and s is a positive integer.

For example, assuming that the codebook size of the first uplink channel is 20 bits and the codebook size of the feedback information is 20 bits, after the feedback information of 20 bits is carried on the first uplink channel, no CSI can be carried on the first uplink channel. If it is assumed that the codebook size of the first uplink channel is 20 bits and the codebook size of the feedback information is 10 bits, after the feedback information of 10 bits is carried on the first uplink channel, CSI can further be carried on the first uplink channel. Assuming that r=2 and each piece of CSI has 10 bits, the access network device may receive the feedback information and the t pieces of CSI of the r pieces of CSI on the first uplink channel resource, where t=1.

As described above, the access network device may receive only some of the r pieces of CSI from the UE, or may receive all of the r pieces of CSI from the UE. This is not specifically limited in this embodiment of the present application.

Figure 8:
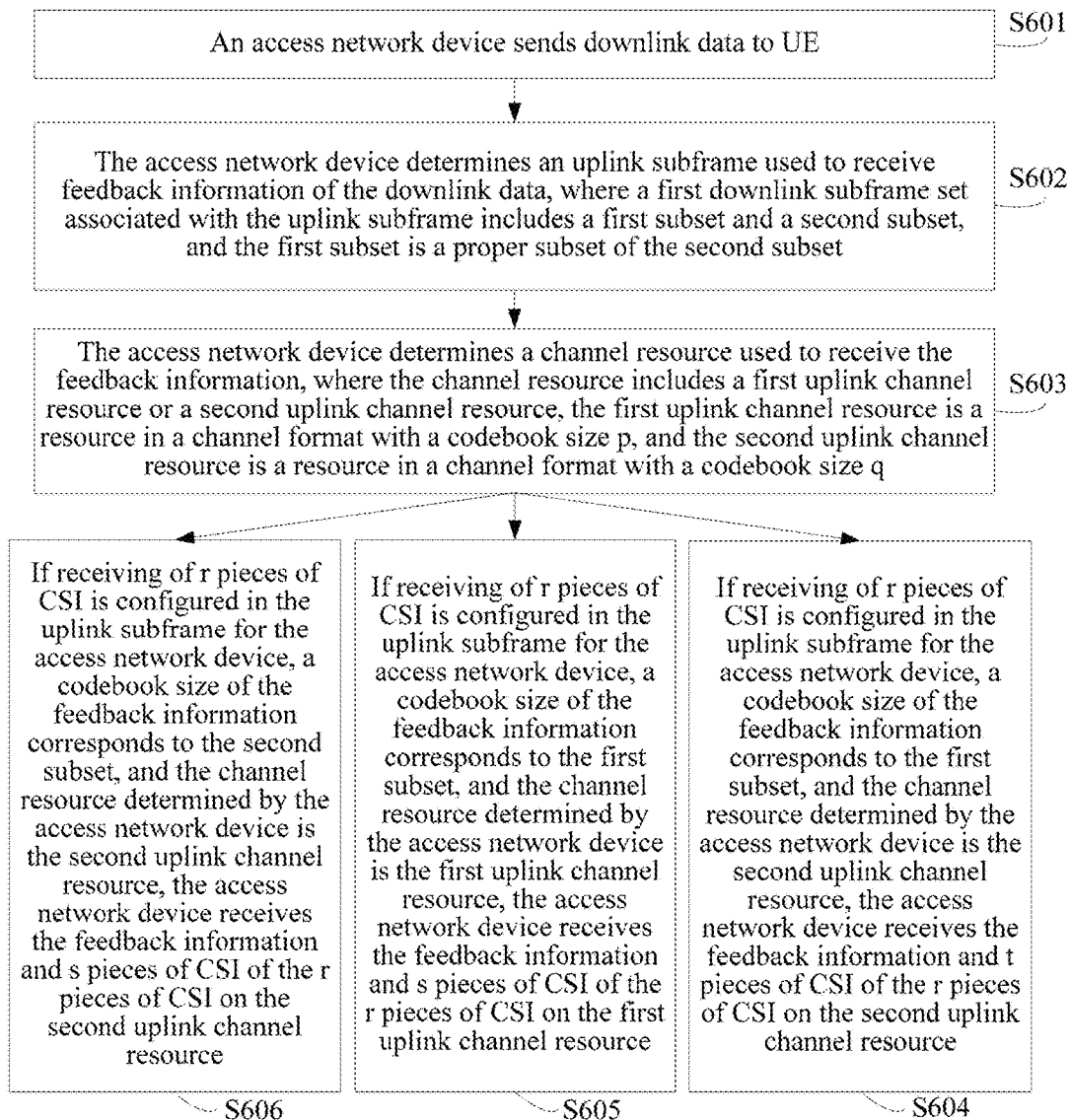
FIG. 8 is a schematic flowchart 6 of a CSI transmission method according to an embodiment of the present application.

Further, as shown in FIG. 8, after step S603, the CSI transmission method provided in this embodiment of the present application may further include the following step.

S606. If receiving of r pieces of CSI is configured in the uplink subframe for the access network device, a codebook size of the feedback information corresponds to the second subset, and the channel resource determined by the access network device is the second uplink channel resource, the access network device receives the feedback information and s pieces of CSI of the r pieces of CSI on the second uplink channel resource, where 0≤s≤r, and q1 and s are positive integers.

Specifically, when receiving of the r pieces of CSI is configured in the uplink subframe for the access network device, the codebook size of the feedback information corresponds to the second subset, and the channel resource determined by the access network device is the second uplink channel resource, the access network device receives the feedback information on the second uplink channel resource according to the codebook size that is of feedback information and that corresponds to the second subset. Therefore, considering that the codebook size that is of feedback information and that corresponds to the second subset is not greater than a codebook size of a second uplink channel, a maximum quantity of bits of feedback information that can be carried on the second uplink channel resource is restricted, and the access network device may receive one or more pieces of CSI on the second uplink channel resource, or cannot receive even one piece of CSI on the second uplink channel resource. That is, the access network device may receive the feedback information on the second uplink channel resource, and may further receive the s pieces of CSI of the r pieces of CSI on the second uplink channel resource, where 0≤s≤r, and s is a positive integer.

For example, assuming that the codebook size of the second uplink channel is 40 bits and the codebook size of the feedback information is 40 bits, after the feedback information of 40 bits is carried on the second uplink channel, no CSI can be carried on the second uplink channel. If it is assumed that the codebook size of the second uplink channel is 40 bits and the codebook size of the feedback information is 20 bits, after the feedback information of 10 bits is carried on the second uplink channel, CSI can further be carried on the second uplink channel. Assuming that r=2 and each piece of CSI has 10 bits, the access network device may receive all of the r pieces of CSI from the UE. That is, the access network device receives the feedback information and the s pieces of CSI of the r pieces of CSI on the second uplink channel resource, where r=s=2.

Certainly, as described above, the access network device may receive only some of the r pieces of CSI from the UE, that is, r>s. For example, if r=3 pieces of CSI is configured in the uplink subframe, but in this case, in addition to the feedback information, only s=2 pieces of CSI can be further carried in the channel format with the codebook size q, the access network device may receive the s pieces of CSI of the r pieces of CSI.

It should be noted that, in this embodiment of the present application, to support CA of more carriers, a method is extending a capacity of a current PUCCH format 3, for example, extending the capacity of the current PUCCH format 3 from one RB to multiple RBs. For a related detailed description and a technical effect, refer to Embodiment 1. Details are not described herein again.

Further, in the CSI transmission method provided in this embodiment of the present application, the sending, by the access network device, downlink data to UE (step S601) may specifically include:

sending, by the access network device, the downlink data to the UE in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE.

Specifically, the second downlink subframe set may be a scheduling set, or an active set. For a related description, refer to Embodiment 1. Details are not described herein again.

It should be noted that, although this embodiment of the present application is described on an assumption that the second downlink subframe set is an actually scheduled downlink subframe set, this embodiment of the present application is also applicable to a case in which the second downlink subframe set is the active downlink subframe set. This is not specifically limited in this embodiment of the present application.

Further, if receiving of the r pieces of CSI is configured in the uplink subframe for the access network device, and the second downlink subframe set is a subset of the first subset, the channel resource determined by the access network device is the first uplink channel resource or the second uplink channel resource; or if receiving of the r pieces of CSI is configured in the uplink subframe for the access network device, the second downlink subframe set includes a downlink subframe in the first subset and a downlink subframe that belongs to the second subset but does not belong to the first subset, and the second downlink subframe set is a subset of the second subset, the channel resource determined by the access network device is the second uplink channel resource.

For example, it is assumed that the first subset includes downlink subframes 4, 5, 6, and 8 on carriers 1 to 5, and the second downlink subframe set includes subframes 4, 5, 6, and 8 on the carrier 1, subframes 4, 5, and 6 on the carrier 2, and subframes 4 and 5 on the carrier 3, where the carrier 1 is a primary carrier. Therefore, the second downlink subframe set is a subset of the first subset. In this case, the channel resource determined by the access network device may be the first uplink channel resource, or may be the second uplink channel resource.

For example, it is assumed that the first subset includes downlink subframes 4, 5, 6, and 8 on carriers 1 to 5, and the second subset includes downlink subframes 4, 5, 6, and 8 on carriers 1 to 10. The second downlink subframe set includes subframes 4, 5, 6, and 8 on the carrier 1, subframes 4, 5, and 6 on the carrier 3, and subframes 4 and 5 on the carrier 6. That is, the second downlink subframe set includes a downlink subframe in the first subset and a downlink subframe that belongs to the second subset but does not belong to the first subset, and the second downlink subframe set is a subset of the second subset. In this case, the channel resource determined by the access network device is the second uplink channel resource.

Further, after the determining, by the access network device, a channel resource used to receive the feedback information (step S603), the method may further include:

sending, by the access network device, resource indication information to the UE, where the resource indication information is used to indicate the channel resource for transmitting the feedback information.

Further, the resource indication information is further used to indicate the codebook size of the feedback information; or the resource indication information is further used to indicate a subset corresponding to the codebook size of the feedback information.

Specifically, for a related description of the resource indication information, refer to Embodiment 1. Details are not described herein again.

Further, after the determining, by the access network device, a channel resource used to receive the feedback information, the method further includes:

if CSI receiving is not configured in the uplink subframe for the access network device, the codebook size of the feedback information corresponds to the first subset, and the channel resource determined by the access network device is the first uplink channel resource, receiving, by the access network device, the feedback information on the first uplink channel resource; or if CSI receiving is not configured in the uplink subframe for the access network device, the codebook size of the feedback information corresponds to the second subset, and the channel resource determined by the access network device is the second uplink channel resource, receiving, by the access network device, the feedback information on the second uplink channel resource.

Further, if CSI receiving is not configured in the uplink subframe for the access network device, and the second downlink subframe set is the subset of the first subset, the channel resource determined by the access network device is the first uplink channel resource; or if CSI sending is not configured in the uplink subframe for the access network device, the second downlink subframe set includes the downlink subframe in the first subset and the downlink subframe that belongs to the second subset but does not belong to the first subset, and the second downlink subframe set is the subset of the second subset, the channel resource determined by the access network device is the second uplink channel resource.

For example, it is assumed that the first subset includes downlink subframes 4, 5, 6, and 8 on carriers 1 to 5, and the second downlink subframe set includes subframes 4, 5, 6, and 8 on the carrier 1, subframes 4, 5, and 6 on the carrier 2, and subframes 4 and 5 on the carrier 3, where the carrier 1 is a primary carrier. Therefore, the second downlink subframe set is a subset of the first subset. In this case, because CSI receiving is not configured in the uplink subframe for the access network device, that is, the access network device needs to receive only the feedback information, the channel resource determined by the access network device is the first uplink channel resource.

For example, it is assumed that the first subset includes downlink subframes 4, 5, 6, and 8 on carriers 1 to 5, and the second subset includes downlink subframes 4, 5, 6, and 8 on carriers 1 to 10. The second downlink subframe set includes subframes 4, 5, 6, and 8 on the carrier 1, subframes 4, 5, and 6 on the carrier 3, and subframes 4 and 5 on the carrier 6. That is, the second downlink subframe set includes a downlink subframe in the first subset and a downlink subframe that belongs to the second subset but does not belong to the first subset, and the second downlink subframe set is a subset of the second subset. In this case, the channel resource determined by the access network device is the second uplink channel resource.

Specifically, in this embodiment of the present application, because CSI receiving is not configured in the uplink subframe for the access network device, the access network device receives the feedback information on the first uplink channel resource according to the codebook size corresponding to the first subset, or the access network device receives the feedback information on the second uplink channel resource according to the codebook size corresponding to the second subset. By introducing a manner of dynamic PUCCH format fallback, overheads of the PUCCH format 3 are reduced.

Embodiment 3

Figure 9:
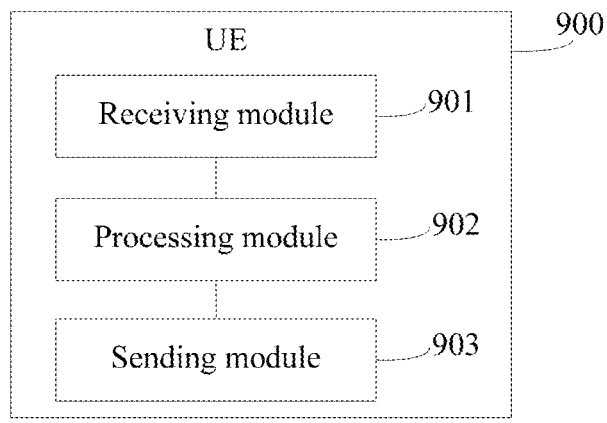
FIG. 9 is a schematic structural diagram of UE according to an embodiment of the present application.

This embodiment of the present application provides UE 900. As shown in FIG. 9, the UE 900 includes: a receiving module 901, a processing module 902, and a sending module 903.

The receiving module 901 is configured to receive downlink data from an access network device.

The processing module 902 is configured to determine an uplink subframe used to send feedback information of the downlink data, where a first downlink subframe set associated with the uplink subframe includes a first subset and a second subset, and the first subset is a proper subset of the second subset.

The processing module 902 is further configured to determine a channel resource used to send the feedback information. The channel resource includes a first uplink channel resource or a second uplink channel resource, the first uplink channel resource is a resource in a channel format with a codebook size p, and the second uplink channel resource is a resource in a channel format with a codebook size q, where $q>p$, $q \geq q1$, $p \geq p1$, p1 is a codebook size that is of feedback information and that corresponds to the first subset, q1 is a codebook size that is of feedback information and that corresponds to the second subset, and p, q, p1, and q1 are all positive integers.

The sending module 903 is configured to: if sending of r pieces of CSI is configured in the uplink subframe for the UE 900, a codebook size of the feedback information corresponds to the first subset, and the channel resource determined by the processing module 902 is the second uplink channel resource, send the feedback information and t pieces of CSI of the r pieces of CSI on the second uplink channel resource, where r≥2, 2≤t≤r, and r and t are both positive integers.

Further, the sending module 903 is further configured to: after the processing module 902 determines the channel resource used to send the feedback information, if sending of r pieces of CSI is configured in the uplink subframe for the UE 900, a codebook size of the feedback information corresponds to the first subset, and the channel resource determined by the processing module 902 is the first uplink channel resource, send the feedback information and s pieces of CSI of the r pieces of CSI on the first uplink channel resource, where 0≤s≤r, and s is a positive integer.

Further, the sending module 903 is further configured to: after the processing module 902 determines the channel resource used to send the feedback information, if sending of r pieces of CSI is configured in the uplink subframe for the UE 900, a codebook size of the feedback information corresponds to the second subset, and the channel resource determined by the processing module 902 is the second uplink channel resource, send the feedback information and s pieces of CSI of the r pieces of CSI on the second uplink channel resource, where 0≤s≤r, and s is a positive integer.

Preferably, the receiving module 901 is specifically configured to:

receive the downlink data in a downlink subframe included in a second downlink subframe set, where the second downlink subframe set includes all scheduled downlink subframes in the first downlink subframe set; or the second downlink subframe set includes downlink subframes in the first downlink subframe set that are on all carriers activated by the UE 900.

Further, if sending of the r pieces of CSI is configured in the uplink subframe for the UE 900, and the second downlink subframe set is a subset of the first subset, the channel resource determined by the processing module 902 is the first uplink channel resource or the second uplink channel resource.

Alternatively, if sending of the r pieces of CSI is configured in the uplink subframe for the UE 900, the second downlink subframe set includes a downlink subframe in the first subset and a downlink subframe that belongs to the second subset but does not belong to the first subset, and the second downlink subframe set is a subset of the second subset, the channel resource determined by the processing module 902 is the second uplink channel resource.

Further, the receiving module 901 is further configured to: before the processing module 902 determines the channel resource used to send the feedback information, receive resource indication information from the access network device, where the resource indication information is used to indicate the channel resource for sending the feedback information.

The determining module is specifically configured to:

determine, according to the resource indication information and a mapping relationship that is between different states in a state set in the resource indication information and different channel resources in a channel resource set and that is preconfigured by the access network device for the UE 900, the channel resource used to send the feedback information, where the channel resource set includes the first uplink channel resource and the second uplink channel resource.

Further, the resource indication information is further used to indicate the codebook size of the feedback information.

The processing module 902 is further configured to determine the codebook size of the feedback information according to the resource indication information and a mapping relationship that is between the different states in the state set in the resource indication information and different codebook sizes in a codebook size set and that is preconfigured by the access network device for the UE 900, where the codebook size set includes the codebook size corresponding to the first subset and the codebook size corresponding to the second sub set.

Optionally, the resource indication information is further used to indicate a subset corresponding to the codebook size of the feedback information.

The processing module 902 is further configured to determine, according to the resource indication information and a mapping relationship that is between the different states in the state set in the resource indication information and subsets corresponding to different codebook sizes in a subset set corresponding to a codebook size and that is preconfigured by the access network device for the UE 900, the subset corresponding to the codebook size of the feedback information, where the subset set corresponding to the codebook size includes the first subset and the second subset.

Further, the sending module 903 is further configured to: after the processing module 902 determines the channel resource used to send the feedback information, if CSI sending is not configured in the uplink subframe for the UE 900, the codebook size of the feedback information corresponds to the first subset, and the channel resource determined by the processing module 902 is the first uplink channel resource, send the feedback information on the first uplink channel resource.

Alternatively, the sending module 903 is further configured to: after the processing module 902 determines the channel resource used to send the feedback information, if CSI sending is not configured in the uplink subframe for the UE 900, the codebook size of the feedback information corresponds to the second subset, and the channel resource determined by the processing module 902 is the second uplink channel resource, send the feedback information on the second uplink channel resource.

Further, if CSI sending is not configured in the uplink subframe for the UE 900, and the second downlink subframe set is the subset of the first subset, the channel resource determined by the processing module 902 is the first uplink channel resource.

Alternatively, if CSI sending is not configured in the uplink subframe for the UE 900, the second downlink subframe set includes the downlink subframe in the first subset and the downlink subframe that belongs to the second subset but does not belong to the first subset, and the second downlink subframe set is the subset of the second subset, the channel resource determined by the processing module 902 is the second uplink channel resource.

It should be noted that, for the units and modules of the UE 900 provided in this embodiment of the present application, the receiving module 901 may be specifically implemented by using a receiver, the sending module 903 may be specifically implemented by using a transmitter, and the processing module 902 may be specifically implemented by using a processor. The processor, the receiver, and the transmitter may communicate with each other. This is not specifically limited in this embodiment of the present application.

Specifically, for a CSI transmission method performed by the UE 900 provided in this embodiment of the present application, refer to the description of Embodiment 1. Details are not described herein again in this embodiment of the present application.

Because the UE 900 in this embodiment can be configured to perform the foregoing method, for technical effects that can be achieved by the UE 900, refer to the description of the foregoing method embodiment. Details are not described herein again.

Embodiment 4

Figure 10:
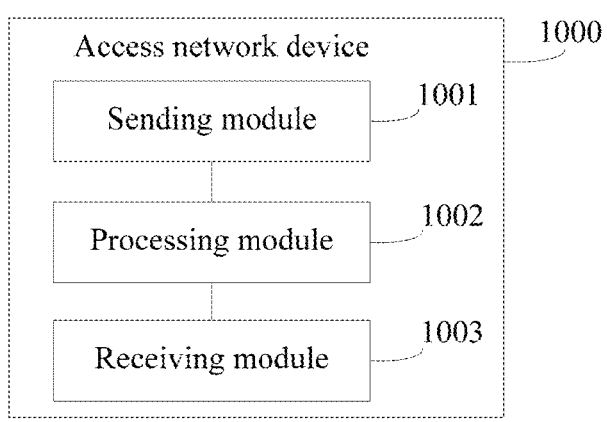
FIG. 10 is a schematic structural diagram of an access network device according to an embodiment of the present application.

This embodiment of the present application provides an access network device 1000. As shown in FIG. 10, the access network device 1000 includes: a sending module 1001, a processing module 1002, and a receiving module 1003.

The sending module 1001 is configured to send downlink data to user equipment UE.

The processing module 1002 is configured to determine an uplink subframe used to receive feedback information of the downlink data, where a first downlink subframe set associated with the uplink subframe includes a first subset and a second subset, and the first subset is a proper subset of the second subset.

The processing module 1002 is further configured to determine a channel resource used to receive the feedback information, where the channel resource includes a first uplink channel resource or a second uplink channel resource, the first uplink channel resource is a resource in a channel format with a codebook size p, and the second uplink channel resource is a resource in a channel format with a codebook size q, where q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers.

The receiving module 1003 is configured to: if receiving of r pieces of CSI is configured in the uplink subframe for the access network device 1000, a codebook size of the feedback information corresponds to the first subset, and the channel resource determined by the processing module 1002 is the second uplink channel resource, receive the feedback information and t pieces of CSI of the r pieces of CSI on the second uplink channel resource, where r≥2, 2≤t≤r, and p1, r, and t are all positive integers.

Further, the receiving module 1003 is further configured to: after the processing module 1002 determines the channel resource used to receive the feedback information, if receiving of r pieces of CSI is configured in the uplink subframe for the access network device 1000, a codebook size of the feedback information corresponds to the first subset, and the channel resource determined by the processing module 1002 is the first uplink channel resource, receive the feedback information and s pieces of CSI of the r pieces of CSI on the first uplink channel resource, where 0≤s≤r, and s is a positive integer.

Further, the receiving module 1003 is further configured to: after the processing module 1002 determines the channel resource used to receive the feedback information, if receiving of r pieces of CSI is configured in the uplink subframe for the access network device 1000, a codebook size of the feedback information corresponds to the second subset, and the channel resource determined by the processing module 1002 is the second uplink channel resource, receive the feedback information and s pieces of CSI of the r pieces of CSI on the second uplink channel resource, where 0≤s≤r, and q1 and s are positive integers.

Preferably, the sending module 1001 is specifically configured to:
send the downlink data to the UE in a downlink subframe included in a second downlink subframe set, where
the second downlink subframe set includes all scheduled downlink subframes in the first downlink subframe set; or
the second downlink subframe set includes downlink subframes in the first downlink subframe set that are on all carriers activated by the UE.

Further, if receiving of the r pieces of CSI is configured in the uplink subframe for the access network device 1000, and the second downlink subframe set is a subset of the first subset, the channel resource determined by the processing module 1002 is the first uplink channel resource or the second uplink channel resource.

Alternatively, if receiving of the r pieces of CSI is configured in the uplink subframe for the access network device 1000, the second downlink subframe set includes a downlink subframe in the first subset and a downlink subframe that belongs to the second subset but does not belong to the first subset, and the second downlink subframe set is a subset of the second subset, the channel resource determined by the processing module 1002 is the second uplink channel resource.

Further, the sending module 1001 is further configured to: after the processing module 1002 determines the channel resource used to receive the feedback information, send resource indication information to the UE, where the resource indication information is used to indicate the channel resource for transmitting the feedback information.

Further, the resource indication information is further used to indicate the codebook size of the feedback information.

Optionally, the resource indication information is further used to indicate a subset corresponding to the codebook size of the feedback information.

Further, the receiving module 1003 is further configured to: after the processing module 1002 determines the channel resource used to receive the feedback information, if CSI receiving is not configured in the uplink subframe for the access network device 1000, the codebook size of the feedback information corresponds to the first subset, and the channel resource determined by the processing module 1002 is the first uplink channel resource, receive the feedback information on the first uplink channel resource.

Alternatively, the receiving module 1003 is further configured to: after the processing module 1002 determines the channel resource used to receive the feedback information, if CSI receiving is not configured in the uplink subframe for the access network device 1000, the codebook size of the feedback information corresponds to the second subset, and the channel resource determined by the processing module 1002 is the second uplink channel resource, receive the feedback information on the second uplink channel resource.

Further, if CSI receiving is not configured in the uplink subframe for the access network device 1000, and the second downlink subframe set is the subset of the first subset, the channel resource determined by the processing module 1002 is the first uplink channel resource.

Alternatively, if CSI sending is not configured in the uplink subframe for the access network device 1000, the second downlink subframe set includes the downlink subframe in the first subset and the downlink subframe that belongs to the second subset but does not belong to the first subset, and the second downlink subframe set is the subset of the second subset, the channel resource determined by the processing module 1002 is the second uplink channel resource.

It should be noted that, for the units and modules of the access network device 1000 provided in this embodiment of the present application, the receiving module 1003 may be specifically implemented by using a receiver, the sending module 1001 may be specifically implemented by using a transmitter, and the processing module 1002 may be specifically implemented by using a processor. The processor, the receiver, and the transmitter may communicate with each other. This is not specifically limited in this embodiment of the present application.

Specifically, for a CSI transmission method performed by the access network device 1000 provided in this embodiment of the present application, refer to the description of Embodiment 2. Details are not described herein again in this embodiment of the present application.

Because the access network device 1000 in this embodiment can be configured to perform the foregoing method, for technical effects that can be achieved by the access network device 1000, refer to the description of the foregoing method embodiment. Details are not described herein again.

A person skilled in the art should be aware that, in the foregoing one or more examples, functions described in the present application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A channel state information (CSI) transmission method, the method comprising:
   sending, by an access network device, downlink data to a user equipment (UE);
   determining, by the access network device, an uplink subframe used to receive feedback information of the downlink data, wherein a first downlink subframe set associated with the uplink subframe comprises a first subset and a second subset, and the first subset is a proper subset of the second subset;
   determining, by the access network device, a channel resource used to receive the feedback information, wherein the channel resource comprises a first uplink channel resource or a second uplink channel resource, the first uplink channel resource is a resource in a channel format with a codebook size p, and the second uplink channel resource is a resource in a channel format with a codebook size q, wherein q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers; and
   if receiving of r pieces of CSI is configured in the uplink subframe, a codebook size of the feedback information corresponds to the first subset, and the determined channel resource is the second uplink channel resource, receiving, by the access network device, the feedback information and t pieces of CSI of the r pieces of CSI on the second uplink channel resource, wherein r≥2, 2≤t≤r, and r and t are all positive integers.

2. The method according to claim 1, wherein after the determining, by the access network device, the channel resource used to receive the feedback information, the method further comprises:
   if receiving of r pieces of CSI is configured in the uplink subframe, a codebook size of the feedback information corresponds to the first subset, and the determined channel resource is the first uplink channel resource, receiving, by the access network device, the feedback information and s pieces of CSI of the r pieces of CSI on the first uplink channel resource, wherein 0≤s≤r, and s is a positive integer.

3. The method according to claim 1, wherein after the determining, by the access network device, the channel resource used to receive the feedback information, the method further comprises:
   if receiving of r pieces of CSI is configured in the uplink subframe, a codebook size of the feedback information corresponds to the second subset, and the determined channel resource is the second uplink channel resource, receiving, by the access network device, the feedback information and s pieces of CSI of the r pieces of CSI on the second uplink channel resource, wherein 0≤s≤r, and q1 and s are positive integers.

4. The method according to claim 1, wherein:
   the first uplink channel resource includes n resource elements, and the second uplink channel resource includes m resource elements, where m≥n, and both m and n are positive integers.

5. The method according to claim 1, wherein:
   the channel format with the codebook size p and the channel format with the codebook size q occupy a same quantity of resource elements, and a length of an orthogonal code used by the channel format with the codebook size p is greater than a length of an orthogonal code used by the channel format with the codebook size q.

6. The method according to claim 1, further comprising:
   determining, by the access network device, the first subset and the second subset by using a preconfigured rule.

7. The method according to claim 6, wherein:
   the preconfigured rule comprises determining the first subset and the second subset first according to a frequency domain carrier index and then according to a time domain subframe index with reference to a bit quantity threshold.

8. The method according to claim 7, wherein the bit quantity threshold is 22 bits.

9. An apparatus, comprising:
   a non-transitory memory storing instructions; and
   a processor coupled to the memory and configured to execute the instructions to:
   send downlink data to user equipment (UE);
   determine an uplink subframe used to receive feedback information of the downlink data, wherein a first downlink subframe set associated with the uplink subframe comprises a first subset and a second subset, and the first subset is a proper subset of the second subset;

determine a channel resource used to receive the feedback information, wherein the channel resource comprises a first uplink channel resource or a second uplink channel resource, the first uplink channel resource is a resource in a channel format with a codebook size p, and the second uplink channel resource is a resource in a channel format with a codebook size q, wherein q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers; and if receiving of r pieces of CSI is configured in the uplink subframe, a codebook size of the feedback information corresponds to the first subset, and the determined channel resource is the second uplink channel resource, receive, the feedback information and t pieces of CSI of the r pieces of CSI on the second uplink channel resource, wherein r≥2, 2≤t≤r, and r and t are all positive integers.

10. The apparatus according to claim 9, wherein the processor is further configured to execute instructions to:
if receiving of r pieces of CSI is configured in the uplink subframe, a codebook size of the feedback information corresponds to the first subset, and the determined channel resource is the first uplink channel resource, receive the feedback information and s pieces of CSI of the r pieces of CSI on the first uplink channel resource, wherein 0≤s≤r, and s is a positive integer.

11. The apparatus according to claim 9, wherein the processor is further configured to execute instructions to:
if receiving of r pieces of CSI is configured in the uplink subframe, a codebook size of the feedback information corresponds to the second subset, and the determined channel resource is the second uplink channel resource, receive the feedback information and s pieces of CSI of the r pieces of CSI on the second uplink channel resource, wherein 0≤s≤r, and q1 and s are positive integers.

12. The apparatus according to claim 9, wherein:
the first uplink channel resource includes n resource elements, and the second uplink channel resource includes m resource elements, where m≥n, and both m and n are positive integers.

13. The apparatus according to claim 9, wherein:
the channel format with the codebook size p and the channel format with the codebook size q occupy a same quantity of resource elements, and a length of an orthogonal code used by the channel format with the codebook size p is greater than a length of an orthogonal code used by the channel format with the codebook size q.

14. The apparatus according to claim 9, wherein the processor is further configured to execute instructions to:
determine the first subset and the second subset by using a preconfigured rule.

15. The apparatus according to claim 14, wherein:
the preconfigured rule comprises determining the first subset and the second subset first according to a frequency domain carrier index and then according to a time domain subframe index with reference to a bit quantity threshold.

16. The apparatus according to claim 15, wherein the bit quantity threshold is 22 bits.

17. An apparatus, comprising:
a non-transitory memory storing instructions; and
a processor coupled to the memory and configured to execute the instructions to:
receive downlink data;
determine an uplink subframe used to send feedback information of the downlink data, wherein a first downlink subframe set associated with the uplink subframe comprises a first subset and a second subset, and the first subset is a proper subset of the second subset;
determine a channel resource used to send the feedback information, wherein the channel resource comprises a first uplink channel resource or a second uplink channel resource, the first uplink channel resource is a resource in a channel format with a codebook size p, and the second uplink channel resource is a resource in a channel format with a codebook size q, wherein q>p, q≥q1, p≥p1, p1 is a codebook size that is of feedback information and that corresponds to the first subset, q1 is a codebook size that is of feedback information and that corresponds to the second subset, and p, q, p1, and q1 are all positive integers; and
send the feedback information and t pieces of channel state information (CSI) of r pieces of CSI in a case that the r pieces of CSI is configured to be sent, a codebook size of the feedback information corresponds to the first subset, and the determined channel resource is the second uplink channel resource, wherein r≥2, 2≤t≤r, and r and t are both positive integers.

18. The apparatus according to claim 17, wherein the processor is further configured to execute instructions to:
send the feedback information and s pieces of CSI of r pieces of CSI in a case that the r pieces of CSI is configured to be sent, a codebook size of the feedback information corresponds to the first subset, and the determined channel resource is the first uplink channel resource, wherein 0≤s≤r, and s is a positive integer.

19. The apparatus according to claim 17, wherein the processor is further configured to execute instructions to:
send the feedback information and s pieces of CSI of r pieces of CSI in a case that the r pieces of CSI is configured to be sent, a codebook size of the feedback information corresponds to the second subset, and the determined channel resource is the second uplink channel resource, wherein 0≤s≤r, and s is a positive integer.

20. The apparatus according to claim 17, wherein the processor is further configured to execute instructions to:
determine the first subset and the second subset first according to a frequency domain carrier index and then according to a time domain subframe index with reference to a bit quantity threshold.

21. The apparatus according to claim 20, wherein the bit quantity threshold is 22 bits.

22. The apparatus according to claim 17, wherein the first uplink channel resource includes n resource elements, and the second uplink channel resource includes m resource elements, where m≥n, and both m and n are positive integers.

23. The apparatus according to claim 17, wherein the channel format with the codebook size p and the channel format with the codebook size q occupy a same quantity of resource elements, and a length of an orthogonal code used by the channel format with the codebook size p is greater than a length of an orthogonal code used by the channel format with the codebook size q.

* * * * *